US008612917B2

(12) United States Patent
Chowdhury

(10) Patent No.: US 8,612,917 B2
(45) Date of Patent: Dec. 17, 2013

(54) METHOD AND SYSTEM FOR SELECTING GATE SIZES, REPEATER LOCATIONS, AND REPEATER SIZES OF AN INTEGRATED CIRCUIT

(75) Inventor: Salim U. Chowdhury, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 541 days.

(21) Appl. No.: 12/437,174

(22) Filed: May 7, 2009

(65) Prior Publication Data

US 2010/0287516 A1 Nov. 11, 2010

(51) Int. Cl.
G06F 17/50 (2006.01)
G06F 9/455 (2006.01)
G06F 11/22 (2006.01)

(52) U.S. Cl.
USPC ............ 716/132; 716/134; 716/135; 716/136

(58) Field of Classification Search
USPC ............................... 716/30, 50–56, 100–139, 716/FOR. 000–FOR. 120
See application file for complete search history.

(56) References Cited

U.S. PATENT DOCUMENTS

| | | | | |
|---|---|---|---|---|
| 5,754,824 | A * | 5/1998 | Damiano et al. | 716/103 |
| 6,493,854 | B1 * | 12/2002 | Chowdhury et al. | 716/114 |
| 7,269,815 | B2 * | 9/2007 | Wein et al. | 716/105 |
| 7,454,730 | B1 * | 11/2008 | Chowdhury | 716/114 |
| 2009/0217225 | A1 * | 8/2009 | Sunder et al. | 716/6 |
| 2009/0293029 | A1 * | 11/2009 | Zuo et al. | 716/6 |
| 2010/0146469 | A1 * | 6/2010 | Chowdhury | 716/10 |

OTHER PUBLICATIONS

Liu, et al., Multi-Scenario Buffer Insertion in Multi-Core Processor Designs, ISPD '08, Apr. 13-16, 2008, Portland, Oregon, USA.
Alpert, et al., Buffer Insertion With Accurate Gate and Interconnect Delay Computation, DAC 99, New Orleans, Louisiana, 1999.
Chen, et al., Noise-aware Repeater Insertion and Wire Sizing for On-chip Interconnect Using Hierarchial Moment-Matching, DAC 99, New Orleans, Louisiana, 1999.
Liu, et al., Buffering Interconnect for Multicore Processor Designs, IEEE Transactions on Computer-Aided Design of Integrated Circuits and Systems, vol. 27, No. 12, Dec. 2008.

(Continued)

*Primary Examiner* — A. M. Thompson
(74) *Attorney, Agent, or Firm* — Brooks Kushman P.C.

(57) ABSTRACT

A method for selecting gate sizes for a logic network of an integrated circuit, wherein the logic network is defined by a plurality of logic paths that includes nodes, gates and interconnect, includes assigning, at one or more computers, gate sizes to gates adjacent to timing path end nodes of the logic network, determining an n-tuple of performance/loading parameters for each of the assigned gate sizes based on gate and interconnect delay models, and determining whether two or more logic paths share a descendent gate. Two or more logic paths that share a descendent gate are coupled. The method also includes grouping the n-tuples of parameters of coupled logic paths into bins based on gate sizes of the shared descendent gate, recursively propagating, node by node, the bins of n-tuples of parameters along the coupled logic paths, detecting whether any of the bins of n-tuples of parameters are suboptimal for all of the coupled logic paths based on a comparison of the n-tuples of parameters in bin-pairs, and eliminating all n-tuples of parameters of the suboptimal bins along the coupled logic paths to prune gate sizes associated with the suboptimal bins.

15 Claims, 8 Drawing Sheets

(56) References Cited

OTHER PUBLICATIONS

Lillis, et al., Optimal Wire Sizing and Buffer Insertion for Low Power and a Generalized Delay Model, IEEE Journal of Solid-State Circuits, vol. 31, No. 3, Mar. 1996.

Liu, et al., A New Algorithm for Simultaneous Gate Sizing and Threshold Voltage Assignment, ISPD '09, Mar. 29-Apr. 1, 2009, San Diego, California, USA.

Alpert, Simlutaneous Driver Sizing and Buffer Insertion Using a Delay Penalty Estimation Technique, ISPD '02, Apr. 7-10, 2002, San Diego, California, USA.

Bhasyam, et al. HW/SW Codesign Incorporating Edge Delays Using Dynamic Programming, ECD Department, 2003, p. 264-271, University of Minnesota, Minneapolis, MN.

Hu, et al., Gate Sizing for Cell Library-Based Designs, DAC 2007, Jun. 4-8, 2007, San Diego, California, USA.

Kuo, et al., Delay Budgeting for a Timing-Closure-Driven Design Method, Department of Computer Science, Tsing Hua University, Hsinchu, Taiwan, 30043, ROC, Proceedings of the 2000 IEEE/ACM international conference on Computer-aided design.

Lillis, Optimal Wire Sizing and Buffer Insertion for Low Power and a Generalized Delay Model, IEEE Journal of Solid- State Circuits, vol. 31, No. 3, Mar. 1996.

van Ginneken, Buffer Placement in Distributed RC-tree Networks for Minimal Elmore Delay, Proceedings IEEE Inernational Symposium on Circuits and Systems, Jun. 1990, 865-868, International Business Machines Corporation, Thomas J. Watson Research Center, Yorktown Heights, New York.

\* cited by examiner

METHOD AND SYSTEM FOR SELECTING GATE SIZES, REPEATER LOCATIONS, AND REPEATER SIZES OF AN INTEGRATED CIRCUIT

BACKGROUND

Certain dynamic programming concepts have been effective in minimizing interconnect delays in rooted tree topologies. Referring to FIG. 1, an example rooted tree 6 may be characterized by a single source 8 connected to an input node 10, and an output node 12. The output node 12 is connected to multiple destination nodes 14, 16, 18 on sinks 15, 17, 19, respectively, via internal nodes 20, 22, 24, 26, 28, 30, 32 and edges (segments of interconnect between two adjacent nodes or between a node and branch point).

An electrical signal is allowed to propagate from the input of the driver 8 to the destination nodes 14, 16, 18. Each of the edges may be characterized by a resistance $R_e$ and a capacitance $C_e$. Each of the destination nodes 14, 16, 18 may be characterized by a capacitance $c_{sink}$ and a required arrival time $q_{sink}$, or equivalently, by a (c, q) pair (tuple), where $c=c_{sink}$ and $q=q_{sink}$. An electrical signal propagating from the source node 10 to the destination nodes 14, 16, 18 experiences delays along the driver and RC network. This may result in different accumulated delays to the different destinations.

Performance and/or cycle-time requirements of a typical microprocessor, for example, may require that the signal reaches the destination nodes 14, 16, 18 at pre-specified times (required arrival times). The signal, however, may fail to arrive at one or more destinations within the specified time. These violations of required arrival times can be alleviated by locating repeaters from the list 36a-36m and 38a-38n (also known as inverting or non-inverting buffers) at some of the internal nodes 20-32. Repeaters are thus to be selected from a given library 40 of sizes and polarities. A goal of repeater insertion can be to reduce the maximum violation in the required arrival time at the driver. Other goals could include minimizing power (area) subject to constraints on signal arrival times at the destinations.

Traditional dynamic optimization techniques are restricted to a rooted tree structure representing an RC network. They may fail to capture certain constraints, such as timing optimization in a hierarchical design, or may not be applicable in logic networks with multiple input gates.

SUMMARY

A method for selecting gate sizes for a logic network of an integrated circuit, wherein the logic network is defined by a plurality of logic paths that includes nodes, gates and interconnect, includes assigning, at one or more computers, gate sizes to gates adjacent to timing path end nodes of the logic network, determining an n-tuple of performance/loading parameters for each of the assigned gate sizes based on gate and interconnect delay models, and determining whether two or more logic paths share a descendent gate. Two or more logic paths that share a descendent gate are coupled. The method also includes grouping the n-tuples of parameters of coupled logic paths into bins based on gate sizes of the shared descendent gate, recursively propagating, node by node, the bins of n-tuples of parameters along the coupled logic paths, detecting whether any of the bins of n-tuples of parameters are suboptimal for all of the coupled logic paths based on a comparison of the n-tuples of parameters in bin-pairs, and eliminating all n-tuples of parameters of the suboptimal bins along the coupled logic paths to prune gate sizes associated with the suboptimal bins.

A method for selecting repeater locations and sizes for a logic network of an integrated circuit, wherein the logic network is defined by a plurality of logic paths that includes nodes, gates and interconnect, and wherein at least some of the nodes are candidate locations for repeaters, includes assigning, at one or more computers, repeater sizes to candidate locations adjacent to timing path end nodes of the logic network, determining an n-tuple of performance/loading parameters for each of the assigned repeater sizes based on repeater delay and loading models, and interconnect delay models, and determining whether two or more logic paths share a descendent candidate location. Two or more logic paths that share a descendent candidate location are coupled. The method also includes grouping the n-tuples or parameters of coupled logic paths into bins based on n-tuples of parameters of the shared descendent candidate location, recursively propagating, node by node and candidate location by candidate location, the bins of n-tuples of parameters along the coupled logic paths, detecting whether any of the bins of n-tuples of parameters are suboptimal for all of the coupled logic paths based on a comparison of the n-tuples of parameters in bin-pairs, and eliminating all n-tuples of parameters of the suboptimal bins along the coupled logic paths to select repeater locations and sizes for the logic network.

A system for concurrently selecting gate sizes, and repeater locations and sizes for a logic network of an integrated circuit, wherein the logic network is defined by a plurality of logic paths that includes nodes, gates and interconnect, and wherein at least some of the nodes are candidate locations for repeaters, includes one or more computers configured to assign gate sizes to gates adjacent to timing path end nodes of the logic network, assign repeater sizes to candidate locations adjacent to the end nodes, and determine an n-tuple of performance/loading parameters for (i) each of the assigned gate sizes based on gate and interconnect delay models, and (ii) each of the assigned repeater sizes based on repeater delay and loading models, and the interconnect delay models, and determine whether two or more logic paths share a descendent gate or a descendent candidate location. Two or more logic paths that share a descendent gate or a descendent candidate location are coupled. The one or more computers are further configured to group the n-tuples of parameters of coupled logic paths into bins based on gate sizes of the shared descendent gate, and n-tuples of parameters of the shared descendent candidate location, recursively propagate, node by node and candidate location by candidate location, the bins of n-tuples of parameters along the coupled logic paths, detect whether any of the bins of n-tuples of parameters are suboptimal for all of the coupled logic paths based on a comparison of the n-tuples of parameters in bin-pairs, and eliminate all n-tuples of parameters of the suboptimal bins along the coupled logic paths to prune gate sizes associated with the suboptimal bins, and to select repeater locations and sizes for the logic network.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
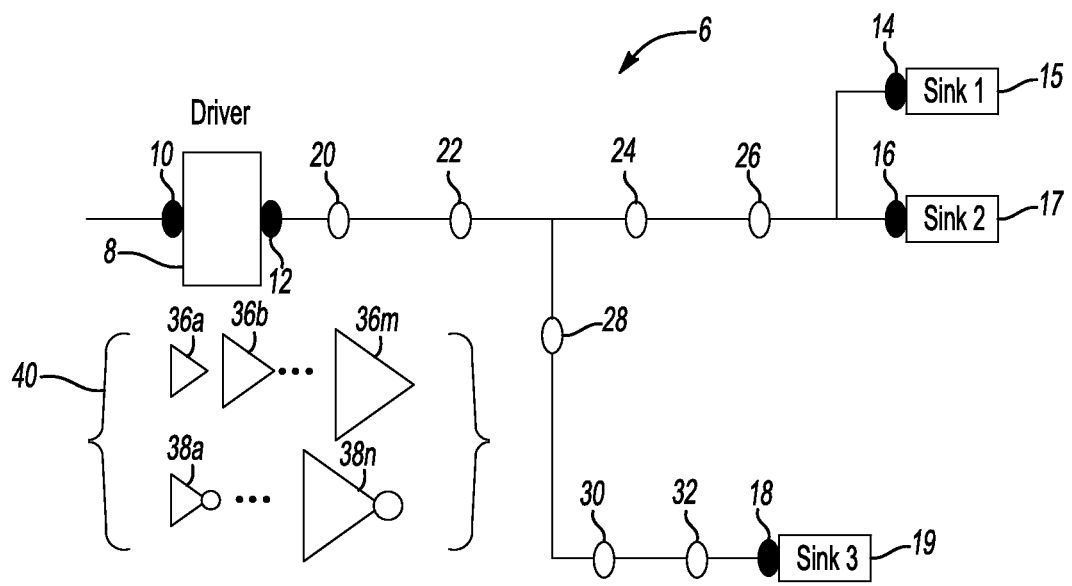
FIG. 1 is a schematic diagram of an example rooted buffer tree.

The impact of choices, including a null repeater choice (the absence of a repeater—a null repeater is thus a repeater size as used herein), for repeater insertion can be captured in a (c, q) pair. At times, other properties may be captured and stored in an n-tuple. These parameters may include area, power, signal slew, a maximum or minimum allowable slew, a generalized cost to include layer assignment of wires, widths and spaces of wires, etc. The number of n-tuple at a node may vary, reflecting multiple choices for the repeater at the node and respective downstream nodes. The n-tuple codes a partial solution of the repeater choice, or the other actions such as layer assignment, assignment of widths and spaces for the current node and the respective downstream nodes, etc. This partial solution is frequently termed as "solution" in this document.

The identification and pruning of sub-optimal solutions may be a requirement of certain dynamic programming concepts. Certain concepts may include a bottom-up traversal technique, where, at a given point in the traversal, one visits a node which is the root of a sub-tree of a complete tree representing an RC network. It may be shown that a solution which is sub-optimal in the sub-tree is also sub-optimal for the entire tree, and hence can be pruned. It may be helpful to identify sub-optimal solutions before or after they are generated. As a result, such sub-optimal solutions are not generated, or are pruned once they are generated. Effective pruning may allow the solution space and run time to be managed within practical limits.

Non-sub-optimal solutions may be retained and propagated upstream. Each solution (or a combination of solutions) at a downstream location(s), may give rise to a solution at the immediate upstream location. Generation and propagation of solutions may continue until the source (root) node is reached. The best solution generated at the source may dictate the best solution(s) at the immediate downstream location(s). A top-down traversal thus determines the best solutions at all downstream candidate locations.

Modifications and variations have been proposed to extend the above methodology to handle general delay models and to control slew, power, noise, etc.

The dynamic techniques under discussion here are not necessarily based on specific models for computing, delay, slew, power or other parameters. The techniques may work unaltered with simplistic models as well as very accurate and detailed models. Thus, model aspects in this document are not necessarily discussed.

Later in this document, suboptimal solutions are identified based on (c, q) pairs (tuples). There are known ways to extend the suboptimal concept from a tuple to general n-tuples. The basic dynamic optimization technique, however, is independent of the way suboptimal solutions are identified.

INTRODUCTION

A class of constrained discrete dynamic optimization techniques are presented herein. These techniques extend the applicability of dynamic optimization methods to a broader class of problems. We start with an abstract model that enumerates the properties of the tree network under which the basic unconstrained version of the dynamic optimization technique becomes effective. These properties may act as a test for any network and optimization objective to check the applicability of the general dynamic optimization techniques. Some of these properties hold for the constrained class of problems, others do not. The techniques presented facilitate extending the dynamic optimization to the new class of constrained problems. The techniques presented may be used, for example, in timing optimization for microprocessors facing increasing demand for cycle time reduction, in logic networks that include multi-input gates, a non-tree network that is connected to multiple drivers (sources), or in multi-core designs where the sources are multiple and lie within or outside the core instances. Examples of other applications for the proposed techniques include hardware-software co-design, and technology mapping in directed acyclic graphs.

Figure 2:
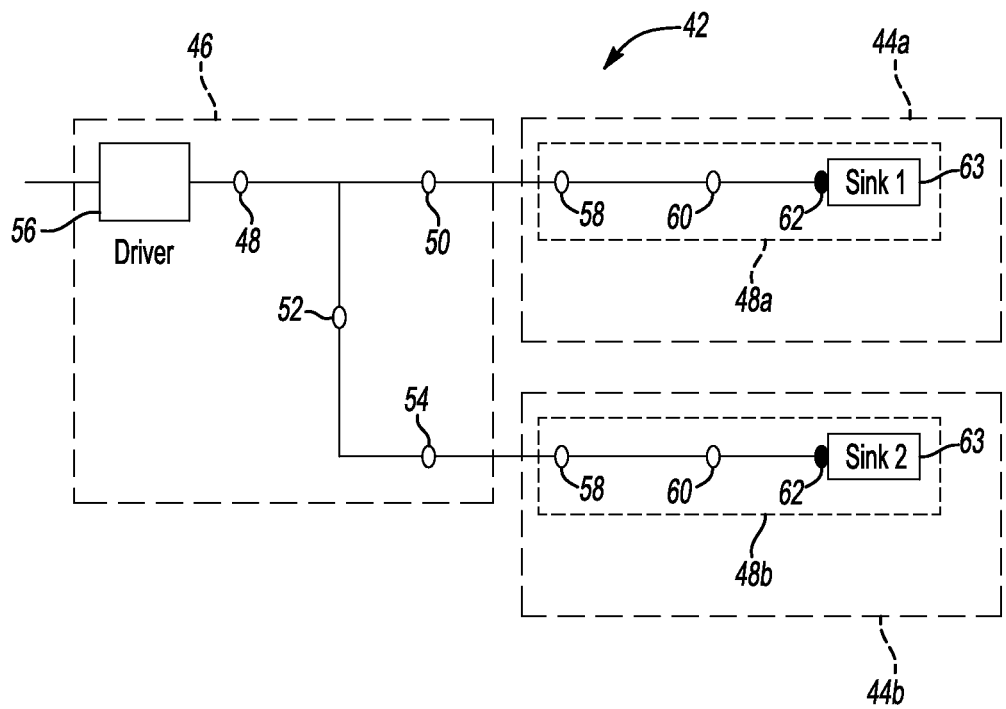
FIG. 2 is a schematic diagram of an example two-core hierarchical net.

Referring now to FIG. 2, a designed block is usually instantiated multiple times in a hierarchical design. For example, a network 42 may have 2 core (block) instances 44a, 44b. Multiple instances of the same block may need to be identical in a design. Therefore, the repeaters inserted in the nets in the blocks 44a, 44b need to be the same for all instances. In this example, a top level net 46, which includes candidate locations 48, 50, 52, 54 and driver 56, connects two replicas of nets 48a, 48b, which each include candidate locations 58, 60, an end node 62, and sink 63 internal to the hierarchical blocks 44a, 44b. Although, the top-level timing requirements for the two instances may not be the same, the repeater-insertion solution in the two replicas of the internal net need to be identical.

Although the network 42 in FIG. 2 is a rooted tree, and a bottom-up traversal can be applied, the requirement to produce unique solutions within different instances may pose some complications. For the example in FIG. 2, the required arrival time at the sinks 63 are $q_1$ and $q_2$ respectively in two instances of the same core. Capacitive loads for the sinks 63, however, are the same in both instances. Within the cores (blocks) 44a, 44b, solutions need to be generated at candidate locations 58, 60. The two sets of solutions for two core instances at a candidate location will have a one-to-one mapping based on the choice of repeaters at the candidate location and at downstream locations. Thus, the solutions for two instances can be paired up. The solutions at candidate location 58 are seen from candidate locations 50, 54 (located on the top-level RC network 46). As mentioned earlier, suboptimal solutions may need to be identified and pruned at all locations. The solutions at locations 50, 54 depend on the solutions at location 58, which is internal to the cores 44a, 44b.

A solution at a downstream location gives rise to multiple solutions at upstream locations. For the same solution at this downstream location, these multiple solutions reflect multiple choices in the upstream. Assume that the set of solutions $\{S_{54k}\}$ is at candidate location 54. This solution set $\{S_{54k}\}$ is due to the solution k at location 58. Similarly, $\{S_{50k}\}$ is the corresponding set of solutions at location 50. If all solutions in $\{S_{54k}\}$ are pruned, then all solutions $\{S_{50k}\}$ must also be pruned. Otherwise, a solution from $\{S_{50k}\}$ could be selected as the best solution at location 50, which will dictate selecting solution k at location 58. If, however, all of $\{S_{54k}\}$ solutions are pruned, no solution at location 54 can be selected that also will dictate selecting solution k at location 58. Thus, pruning of solutions at locations 50 and 54 are coupled and cannot be accomplished independently. (The traditional method of pruning is uncoupled (or unconstrained) and fails, in general, to produce an optimal solution in multi-core (hierarchical) design.)

Figure 3:
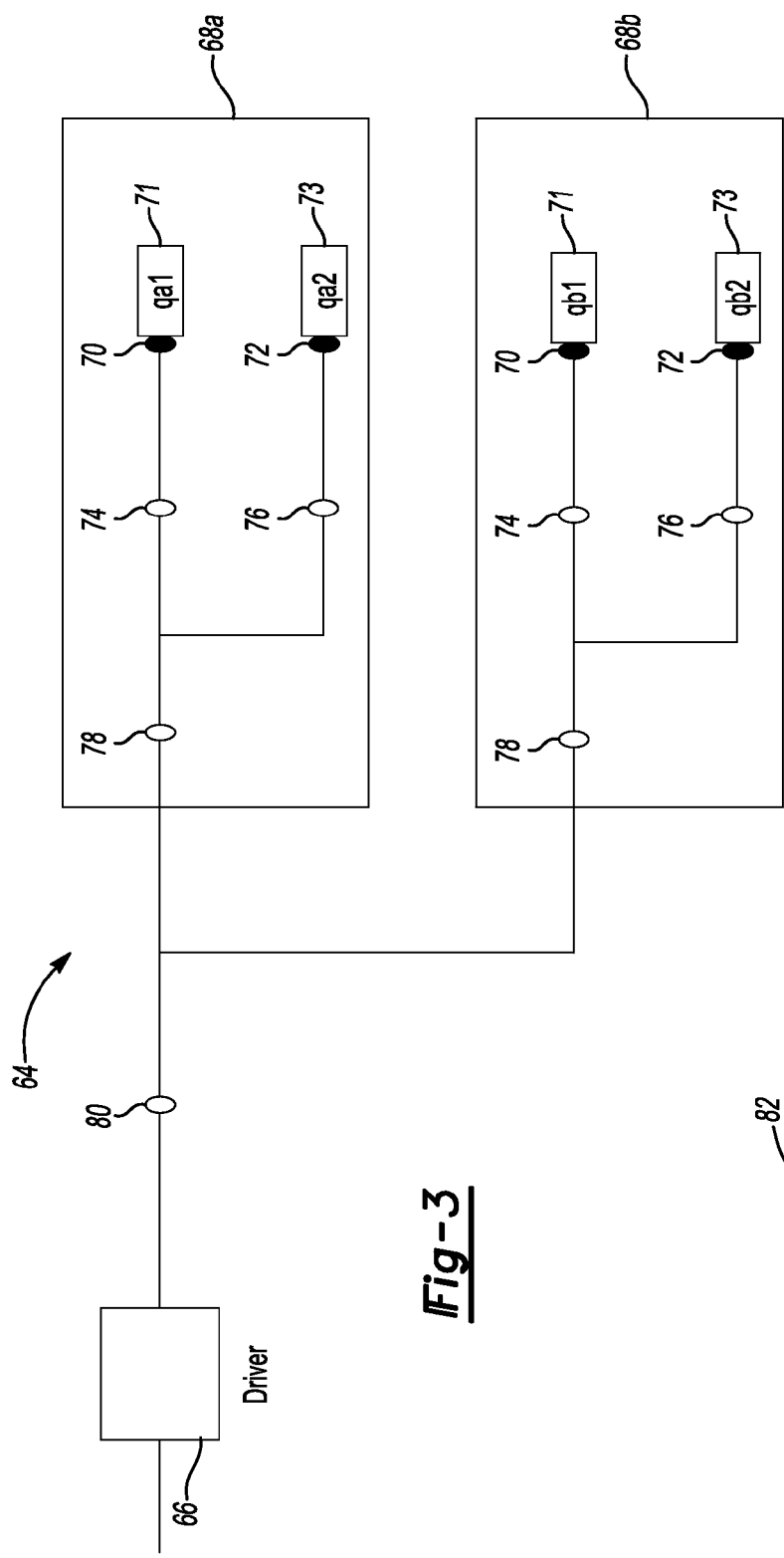
FIG. 3 is a schematic diagram of another example two-core hierarchical net.

Referring now to FIG. 3, a network 64 includes a driver 66 and core blocks 68a, 68b. Each of the core blocks 68a, 68b includes end nodes 70, 72, sinks 71, 73, and repeater insertion candidate locations 74, 76, 78. Repeater insertion candidate location 80 is adjacent to the driver 66. Assuming there is only one repeater type available, there can be only two choices for every candidate location: (a) place a repeater or (b) do not place a repeater. There are eight possible solutions for the candidate locations 74, 76, 78. These eight solutions are enumerated in Table 1 (for certain RC interconnects and buffer characteristics) in which capacitance, c, is a loading parameter and required arrival time, q, is a performance parameter. Input Data Assumed:

$q_{a1}$=100; (sink 71 is critical in core 68a)
$q_{a2}$=200;
$q_{b1}$=200;
$q_{b2}$=100; (sink 73 is critical in core 68b)

The following 8 solutions are generated (determined) for candidate location 78 (solutions are in the format: $c_{78}$, $q_{78a}$, $q_{78b}$, which form n-tuples of performance and loading parameters.):

TABLE 1

Solutions generated at candidate location 78.

| Solution | Location 78, 76, 74 | $c_{78}$ | $q_{78a}$ | $q_{78b}$ | Sub-optimal? |
|---|---|---|---|---|---|
| 1 | 0-0-0 | 200 | 60 | 50 | |
| 2 | 0-1-0 | 160 | 45 | 60 | |
| 3 | 0-1-1 | 70 | 55 | 40 | |
| 4 | 0-0-1 | 110 | 70 | 45 | |
| 5 | 1-0-0 | 10 | 30 | 20 | Yes |
| 6 | 1-1-0 | 10 | 19 | 34 | |
| 7 | 1-1-1 | 10 | 38 | 23 | Yes |
| 8 | 1-0-1 | 10 | 49 | 24 | |

It can be seen that both solutions 5 and 7 are sub-optimal in both cores compared to solution 8. In (c,q) format, for two solutions $(c_1, q_1)$ and $(c_2, q_2)$, the second solution $(c_2, q_2)$ is suboptimal compared to $(c_1, q_1)$ if $(c_2 > c_1)$ and $(q_2 \leq q_1)$. In the traditional method of uncoupled pruning, solutions in the core 68a would be pruned by comparing $(c_{78}, q_{78a})$ pairs and the solutions in the core 68b would be pruned by comparing $(c_{78}, q_{78b})$ pairs. Accordingly, solutions 1, 2, 5, 6 and 7 would be pruned in the core 68a, and solutions 1, 5, 7 and 8 would be pruned in the core 68b. Differences in sink criticality between the two cores may result in differences between the two sets of suboptimal solutions.

The solutions at candidate location 80 may now be computed. For simplicity, assume the delay formulae (gate and interconnect delay models) for the two branches (from location 80 to location 78 in core 68a, and from location 80 to location 78 in core 68b), which are expressed in terms of delay, d, resistance, r, and capacitance, c, to be respectively:

$$d_1 + r_1 * c_{78} \text{ and}$$

$$d_2 + r_2 * c_{78}$$

Also, assume that the additional capacitance due to the interconnect network from the node 80 to the nodes 78 within the two cores to be 70.

Tables 2, 3 and 4 show the solutions computed at the location 80 for various values of $d_1$, $d_2$, $r_1$, and $r_2$. The tables also show the respective optimal solutions. The optimal solutions are entirely different for different combinations of the values of $d_1$, $d_2$, $r_1$ and $r_2$.

TABLE 2

Solutions generated at candidate location 80.
$d_1 = 10, r_1 = 0.2, d_2 = 50, r_2 = 1$

| Solution | Location 78-76-74 | $c_{80}$ | $q_{78a} - d_1 - r_1 * c_{78}$ | $q_{78b} - d_2 - r_2 * c_{78}$ | $q_{min}$ | Optimal Solution (*) |
|---|---|---|---|---|---|---|
| 1 | 0-0-0 | 270 | 10 | −200 | −200 | |
| 2 | 0-1-0 | 230 | 3 | −150 | −150 | |
| 3 | 0-1-1 | 140 | 31 | −80 | −80 | |
| 4 | 0-0-1 | 180 | 38 | −115 | −115 | |
| 6 | 1-1-0 | 80 | 7 | −26 | −26 | * |
| 8 | 1-0-1 | 80 | 37 | −36 | −36 | |

Solution 6 (for 1-1-0 combination of repeaters in locations 78-76-74) is optimal. Note that in the traditional method of uncoupled pruning, this solution would have been pruned within core 68a. Therefore, the traditional method would fail to obtain the optimal solution in this case.

TABLE 3

Solutions generated at candidate location 80.
$d_1 = 50, r_1 = 1, d_2 = 10, r_2 = 0.2$

| Solution | Location 78-76-74 | $c_{80}$ | $q_{78a} - d_1 - r_1 * c_{78}$ | $q_{78b} - d_2 - r_2 * c_{78}$ | $q_{min}$ | Optimal Solution (*) |
|---|---|---|---|---|---|---|
| 1 | 0-0-0 | 270 | −190 | 0 | −190 | |
| 2 | 0-1-0 | 230 | −165 | 18 | −165 | |
| 3 | 0-1-1 | 140 | −65 | 16 | −65 | |
| 4 | 0-0-1 | 180 | −90 | 13 | −90 | |
| 6 | 1-1-0 | 80 | −41 | 22 | −41 | |
| 8 | 1-0-1 | 80 | −11 | 12 | −11 | * |

Solution 8 (for 1-0-1 combination of repeaters in locations 78-76-74) is optimal. Note that in the traditional method of uncoupled pruning, this solution would have been pruned within core 68b. Therefore, the traditional method would fail to obtain the optimal solution in this case.

TABLE 4

Solutions generated at candidate location 80.
$d_1 = 10, r_1 = 0.2, d_2 = 10, r_2 = 0.2$

| Solution | Location 78-76-74 | $c_{80}$ | $q_{78a} - d_1 - r_1 * c_{78}$ | $q_{78b} - d_2 - r_2 * c_{78}$ | $q_{min}$ | Suboptimal? |
|---|---|---|---|---|---|---|
| 1 | 0-0-0 | 270 | 10 | 0 | 0 | yes |
| 2 | 0-1-0 | 230 | 3 | 18 | 3 | yes |
| 3 | 0-1-1 | 140 | 31 | 16 | 16 | |
| 4 | 0-0-1 | 180 | 38 | 13 | 13 | yes |
| 6 | 1-1-0 | 80 | 7 | 22 | 7 | yes |
| 8 | 1-0-1 | 80 | 37 | 12 | 12 | |

In this case, the optimal solution cannot be determined at this location, but needs to be selected from solutions 3 and 8 at an upstream location. The traditional method prunes the solution in core 68b, again making it possible to fail in obtaining the optimal solution. It is established here that, in general, the traditional method does not guarantee obtaining the optimal solution for a multi-core repeater insertion problem. It may also be mentioned that, in general, traditional methods may fail for gate sizing in the presence of multiple cores. The same is true for concurrent repeater insertion and gate sizing for multi-core design.

Multiple-Input Gate

Figure 4:
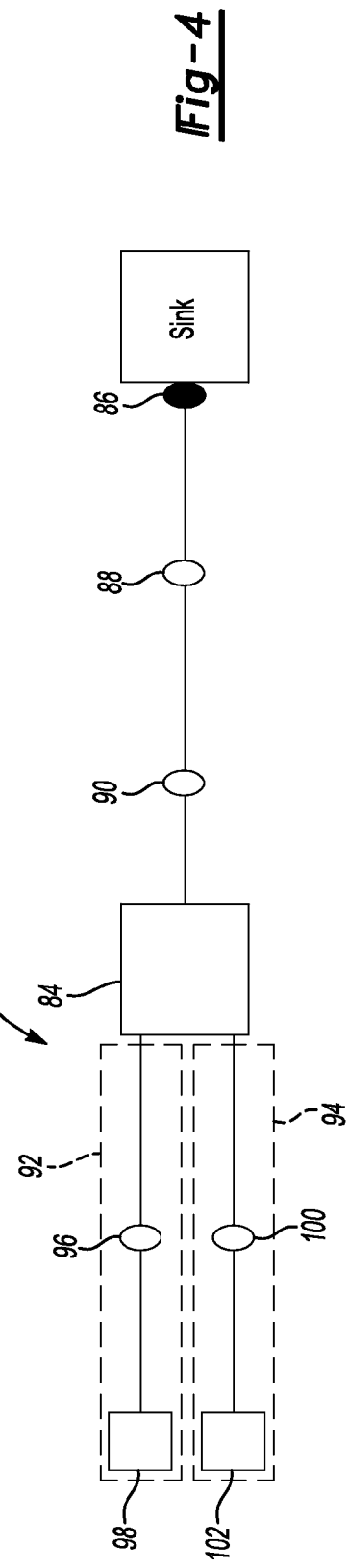
FIG. 4 is a schematic diagram of an example gate with multiple fan-ins.

Referring now to FIG. 4, the presence of multiple fan-ins creates structures which are not rooted trees. Network 82 is such an example. The network 82 includes a gate 84, end node 86, candidate locations 88, 90, and nets 92, 94. The net 92 includes candidate location 96 and source node 98. The net 94 includes candidate location 100 and source node 102. The gate 84 is upstream of the candidate locations 88, 90. All solutions at location 90 are seen by the gate 84. Thus, whether the gate 84 is being sized or not, multiple solutions are propagated at the gate 84. All these solutions are propagated to location 96 as well as location 100. That is, the logic paths 92, 94, which transmit signals from the source nodes 98, 102 toward the end node 86, share the gate 84 (a common descendent gate) and are thus coupled. Pruning solutions at locations 96, 100 are coupled and cannot be carried out independently.

While individually the nets 92, 94 are rooted trees, the constraint that the solutions at locations 96, 100 cannot be pruned independently makes the nets 92, 94 coupled into a multi-source non-rooted tree network. Existing dynamic optimization algorithms cannot solve repeater insertion or gate sizing problems in this scenario.

Although the multi-core repeater insertion appears to be a completely different problem compared to gate sizing with multi-input gates, the proposed concept of coupled pruning renders these seemingly two different problems to be identical. The techniques presented here are equally applicable when considering gate sizing (including high Vt or low Vt variations), and repeater insertion concurrently in more complex networks known as directed acyclic graphs (dag), and in the presence of hierarchies. The dag usually starts at some nodes called "start" nodes, which also can be considered source nodes. The source nodes are usually output nodes to certain sequential gates (e.g., flops). The dag usually ends in some node called "end" nodes, which are usually inputs to certain sequential gates (e.g., flops). For our discussion, start nodes and end nodes can be any general nodes.

Besides the start nodes and end nodes, the dag contains gates, each of which is between a set of input nodes and a set of output nodes. In addition, we can have nodes representing candidate locations on interconnects. Certain other nodes (which may not be shown explicitly here) are branching points on the interconnects.

The nodes where pruning is coupled are termed coupled nodes. Notice that we can have a logic path (going via interconnects and one or more logic gates) containing multiple nodes. All of which may be coupled to one or more sets of nodes on separate logic paths. These logic paths are termed coupled logic paths. At times, we mention them as coupled paths or co-branches.

Abstract Model for Discrete Dynamic Optimization in a Single Rooted Tree

Certain existing dynamic optimization approaches may be described as follows. An objective function $f_n(x)$ is associated with each node n (destination/internal/source), where the set $\{x\}$ designates a set of discrete actions (for example, insert a repeater of size "y", where "y" is a chosen discrete value from a set of discrete sizes) that can be taken at each node. Such dynamic optimization techniques work when the following properties are valid for a tree network:

Property 1: Any action "x" at any node potentially changes the value of f at all nodes in the tree.

Property 2: The actions $\{x_1, x_2, \ldots, x_m\}$ can be sorted such that the resulting changes on f at an upstream node (which is closer to the root node) constitute a monotonically increasing series: $f(x_1) > f(x_2) > \ldots > f(X_m)$.

Property 3: A rooted tree allows enumerating paths from the source node to the destination nodes. One can identify a critical destination, and for the path to the critical node, an "additive" property for the values of f at the nodes on the path is satisfied. Thus, if there is a path from node $n_1$ to $n_3$ (critical node) and node $n_2$ is an intermediate node on this path, then $f_{n3} - f_{n1} = d_{n3-n2} + d_{n2-n1}$, where $d_{n3-n2}$ etc., are defined properties (e.g., delays for RC network).

Property 4: The values of f at the destination nodes are given.

The objective is to maximize the value of $f_{root}$ at the root node. An internal node $n_{st}$ is the root for a sub-tree rooted at the node $n_{st}$. Let "$n_L$" be a leaf node for the sub-tree rooted at $n_{st}$. If an action x at node $n_{st}$ increases $d_{root-nst}$ and also $d_{n-nL}$, then it is easy to see that the action x reduces the value of $f_{root}$ (properties 3 and 4). This fact then lays the foundation of the discrete dynamic optimization in a rooted tree network, and suggests a mechanism for determining x at all nodes for optimal $f_{root}$ by traversing the nodes in a bottom up fashion. Property 2 allows comparing two actions $x_1$ and $x_2$ at a node $n_{st}$. Assume $f_{root}(x_2) < f_{root}(x_1)$. If it also happens that $d_{nst-nL}(x_2) > d_{nst-nL}(x_1)$, then $x_2$ can be eliminated as a sub-optimal choice (compared to action $x_1$).

Application of the Abstract Model for Minimizing Critical Path Delay in an RC Network In the context of an RC tree (network) and repeater insertion, actions $\{x\}$ represent inserting repeaters from a prescribed library of sizes or inserting no repeater, and the objective $f_{root}$ is the required arrival time at the root. The repeaters can be sorted in terms of their input-capacitance, $c_{in}$, values. Increases in capacitance at an internal node will reduce f(n) at an upstream node n, including the root node. Thus, property 2 is satisfied. An RC network also satisfies the additive property 3. The required-arrival times at each sink are given, satisfying property 4. Property 1 is also true for RC networks.

Referring again to FIG. 1, a bottom-up process is used to propagate solutions from sinks to the driver. This bottom-up process may include first processing a candidate location close to the sinks (for example, leaf level locations 26, 32), and then repeating the process for a candidate location which is in the immediate up-stream of an already processed candidate location. For example, an acceptable order of processing the candidate locations is 26-24-32-30-28-22-20-12-10. Thus, it is enough to illustrate the generation and pruning method, first, at a candidate location which has two sink children, and then at a candidate location which has two children which are also candidate locations. Generalization to other situations is straight forward.

Solution Generation at Leaf Level

Figure 5:
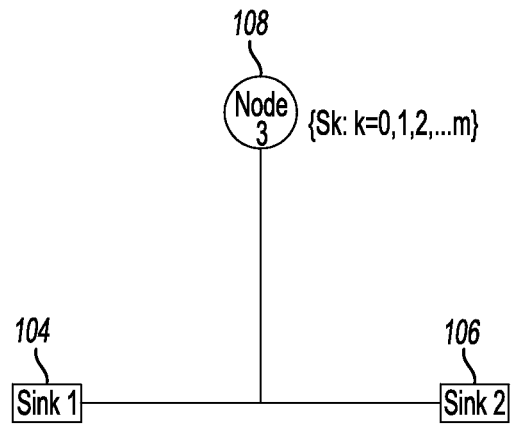
FIG. 5 is a schematic diagram of an example candidate location driving two sinks.

Referring now to FIG. 5, let the inputs at sink 104 be $(c_1, q_1)$ where $c_1$ is the input capacitance at the sink 104, and $q_1$ is the required arrival time at the sink 104. Similarly, let the inputs at sink 106 be $(c_2, q_2)$. Since, at each of the sinks, there is only one solution (i.e. one set of inputs), there is only one combination of the solutions at the sink (leaf) level.

To construct the solution k (corresponding to a choice of repeater) at a candidate location (node 108), two values of delays $d_{k1}$ and $d_{k2}$ (the delays to the sinks 104, 106 respectively from the node 108) are computed in a known fashion. The component $c_k$ is the given input capacitance for the repeater choice k, and $q_k = \min(q_1 - d_{k1}, q_2 - d_{k2})$. For the null repeater option, the total downstream capacitance (sum of the interconnect capacitance plus gate capacitances) is used as the value of $c_k$.

Application of the above process for (m+1) choices at the node 108 will give rise to (m+1) solutions at the node 108, some of which may be sub-optimal, hence require pruning.

Identifying and Pruning Sub-Optimal Solutions

An inserted repeater isolates a network into two sub-networks. The repeater acts as a driver for the downstream sub-network rooted at the repeater. The drive strength of the repeater determines its comparative value as far as driving the downstream sub-network is concerned. The repeater also acts as a load for the upstream sub-network. As far as the upstream sub-network is concerned, the relative value of a repeater is dictated by its input capacitance. A large repeater may have a good drive strength for the downstream sub-network, but it may provide too much load for the upstream sub-network. Similarly, a small repeater may provide a weak drive strength for the downstream sub-network, but may provide less load for the upstream sub-network. In addition, the intrinsic delays through the repeaters are, usually, different for different repeaters.

In certain existing methodologies, the objective of repeater insertion is to minimize the delay in the critical path (among all destinations/sinks), which is the same as maximizing the required arrival time q. Thus, if there are two solutions having (c, q) pairs given by $(c_1, q_1)$ and $(c_2, q_2)$, respectively, then if $(c_2 > c_1)$ but $(q_2 \leq q_1)$, the solution $(c_2, q_2)$ can be deleted (for being sub-optimal). This is because solution 2 proves to be disadvantageous for the downstream sub-network (less q) as well as for the upstream sub-network (higher c).

Solution Generation at Non-Leaf Level

Figure 6:
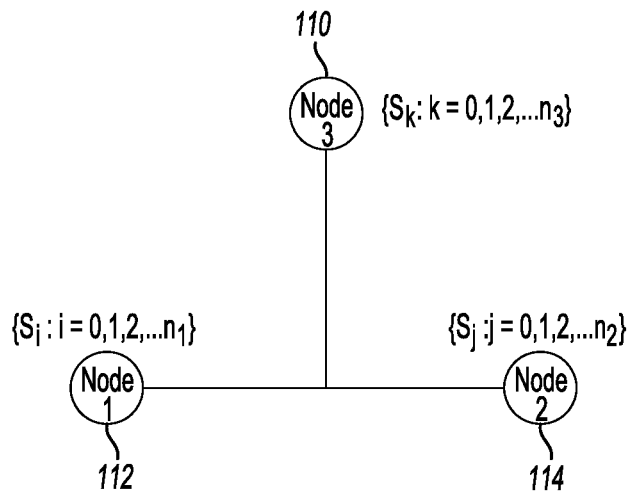
FIG. 6 is a schematic diagram of an example candidate location driving two other candidate locations.

Referring now to FIG. 6, for a candidate location (node 110) having two descendents (nodes 112, 114) that are also candidate locations, $n_1 \geq 1$ solutions at the node 112 and $n_2 \geq 1$ solutions at the node 114 have been computed in a known fashion. For any of the m+1 choices of repeaters at the node 110, there are $n_1 * n_2$ combinations of solutions at the descendent nodes 112, 114. As is known, however, only $n_1 + n_2$ combinations need to be considered (in the worst case), as far as late-mode timing is concerned. The process of advancing through these combinations is outlined as follows.

The solutions at nodes 112 and 114 are sorted in ascending orders of c. Initially, a pointer points to the first solution at the node 112, and a second pointer points to the first solution at the node 114. For a given repeater choice at the node 110, and the combination of solutions i and j pointed to by the two pointers at the nodes 112, 114, respectively, the delays $(d_{ij1}, d_{ij2})$ to the descendents are computed. The $q_3$ value at the node 110 is computed from $\min(q_i - d_{ij1}, q_j - d_{ij2})$. The minimum q value dictates which node (node 112 or node 114) is timing critical. Assuming that the node 112 is critical, for any of the combinations (i, g) where g can be (j+1, j+2, ... n2), the node 112 remains critical with increasingly higher delay and lower q at the node 110. The load capacitance at the node 114 is always increasing as g is increased. Thus, to avoid enumerating all these sub-optimal combinations, the pointer is advanced at the critical node, and the procedure of computing delays and q are repeated. Since, at least one of the pointers is advanced at every iteration, the maximum number of iterations possible is $n_1 + n_2$.

Foundations for Constrained Discrete Dynamic Optimization

As mentioned with respect to FIG. 1, pruning solutions at certain candidate locations may become dependent on others. To formalize such scenarios, candidate locations may be classified into two groups: group 1 includes the candidate locations where pruning can be accomplished independent of pruning in any other candidate location; group 2 includes the candidate locations where pruning cannot be accomplished independently. Logic paths containing the candidate locations where pruning cannot be accomplished independently are called "coupled" logic paths (co-branches). For example, the branches 50-58 and 52-54-58 illustrated in FIG. 2 are coupled logic paths. The candidate location 58, in this example, which imposes this restriction is called the "common descendent" candidate location. In this example, the coupled logic paths are entirely on RC interconnects. In other situations, they may contain logic gates.

The solutions (n-tuples of performance and loading parameters) at the candidate locations in a coupled logic path are put (grouped) into bins. Referring again to FIG. 2, there are n bins corresponding to n $\{s_k, k=1, \ldots, n\}$ solutions at the common descendent location 58. Solutions arising from solution $s_k$ are put into bin k (k=1, ..., n).

The binning process (putting solutions in a bin) is similar to grouping solutions. The binning process assists in accomplishing coupled pruning. Note, however, that explicit binning is not a requirement nor limits the general principle described here. The notion of coupling can be accomplished via other ways such as keeping a history of solution generation. Use of the terms binning, bins, etc. herein thus contemplates these alternatives.

There may be various situations when coupled pruning is needed and the binning method becomes useful. Dealing with gate sizing or repeater insertion in multi-core designs is one example. The presence of multi-input gates also may require coupled pruning because the same solutions at the output(s) of the gate are being propagated to more than one input (and then to more than one logic path). In addition, sizing the gate itself may require impact of multiple choices for gate sizes being propagated to multiple logic paths via multiple inputs. There may be other situations where the binning process may prove useful.

Intra-bin pruning is the same as in existing techniques. Special attention, however, is needed for inter-bin pruning Referring again to FIG. 2 (and assuming that candidate location 52 is absent), the candidate locations 50, 54 have a common descendent location 58. Assume there are two solutions $s_{58a}$ and $s_{58b}$ at the node 58. There are two sets (bins) of solutions (n-tuples of performance and loading parameters) at each of the locations at the nodes 50, 54. Sets $S_{50a}$ and $S_{54a}$ (a bin-pair) originate from the solution $s_{58a}$, and the sets $S_{50b}$ and $S_{54b}$ (a bin-pair) originate from the solution $s_{58b}$.

Let the set $S_{50a} = \{s_{50-1a}, s_{50-2a}\}$, and the set $S_{50b} = \{s_{50b}\}$. Assume $s_{50-1a} = (1, 10)$ is detected to be sub-optimal compared to $s_{50b}=(1, 11)$ based on a comparison of the solutions in bin-pairs, and hence $s_{50-1a}$ is pruned (eliminated). But $s_{50-2a}=(2, 12)$ is not pruned since it is not sub-optimal. The unpruned solutions at the nodes 50, 54 are then propagated to the upstream location 48. At the upstream location 48, however, it turns out that the logic path via the node 54 is critical. The best solution stems from solution $s_{58a}$, and that the only remaining solution $s_{50-2a}$ (in bin a) is selected for the node 50.

Note, however, that the capacitive load for solution $s_{50-2a}$ is more than that for solution $s_{50-1a}$ (which was pruned). Therefore, the solution $s_{50-1a}$ would have resulted in a better solution, and as such, the solution $s_{50-1a}$ should not have been pruned. Thus, theorem 1 follows:

Theorem 1: Solutions (all of them) in a bin can be pruned if and only if all solutions in the bin are sub-optimal (with respect to solutions in another bin) in all co-branches.

Proof: Assume all the solutions in a bin are sub-optimal in all co-branches, but none of the solutions are pruned, i.e., all solutions are propagated upstream. Now assume that one of the un-pruned sub-optimal solutions resulted in an optimal solution at an upstream location. It is easy to see that the optimal solution can be improved by replacing this selected solution with a different non-suboptimal solution in a second bin, in each co-branch. Consider the case when there is at least one non-suboptimal solution in a bin in one of the co-branches. Now assume the contrary is true. This contrary assumption indicates that even though all solutions in a bin are not sub-optimal, a final optimal solution will not be compromised by pruning some sub-optimal solutions in the bin. The above example serves as a counterexample.

Theorem 1 shows that, during inter-bin pruning, a solution in a bin cannot be pruned if it is sub-optimal with respect to a 2nd solution in a 2nd bin, unless all solutions in the first bin are sub-optimal.

Since there may be multiple coupled logic paths and multiple bins within each path, the following situations may be encountered:

a. Within a single logic path, it may happen that all solutions in a first bin are sub-optimal compared to other solutions that come from one or more bins in the same logic path.

b. For one logic path, solutions in the first bin may be suboptimal compared to the solutions in a 2nd bin, and for a second logic path, the solutions in the first bin are suboptimal compared to the solutions in a third bin. Whether or not all solutions in the first bin can be pruned is the subject of Theorem 2 (explained below) and its corollary.

Once two or more coupled logic paths meet at a candidate location (e.g., location 48 in FIG. 2,) current techniques may be applied with the modification that only solutions in bin X (representing a size of a gate or a solution at a candidate location, or a combination thereof) from all co-branches can be combined to construct solutions in bin X at the current location. Theorem 2 (explained below) is a result of this restricted merging that follows rule 1:

Rule 1: Solutions from multiple coupled logic paths can be combined if and only if the solutions come from the same-label bins.

Definition: A bin X is said to be sub-optimal compared to a bin Y if for every solution x∈X there exist a solution y∈Y such that x is sub-optimal to y.

Definition: If a solution x (bin X) is sub-optimal compared to another solution y (bin Y), then solution y (bin Y) is called the dominating solution (bin).

Observation 1: Combining (merging) solutions from sub-optimal bins results in sub-optimal solutions compared to solutions produced by merging solutions from dominating bins. This observation results from the fact that, for a given coupled logic path, the upstream network is the same for a sub-optimal solution and a dominating solution.

Theorem 2: A bin X (in all coupled logic paths) can be pruned if and only if there exists another bin Y (at all coupled logic paths) such that bin X is sub-optimal compared to bin Y.

Proof: Assume there are two coupled logic paths and three bins X, Y, and Z. Assume bin X is sub-optimal compared to bin Y in both coupled logic paths. Then, since the upstream network is the same for any bin within a logic path, any solution that will result from propagating/merging solutions from bin X will be sub-optimal compared to solutions that will result from propagating/merging solutions in bin Y. Therefore, bin X can be safely pruned. Now assume (a) bin X is sub-optimal compared to bin Y (dominating) in coupled logic path 1 and (b) bin X is sub-optimal compared to bin Z (dominating) in coupled logic path 2. Consider an upstream location where bins are merged. According to rule 1, solutions in bin X from both coupled paths can be merged. Similarly, solutions from bin Y (Z) from both coupled logic paths can be merged. The solutions in the dominating bins Y (in coupled path 1) cannot be merged with solutions with dominating bin Z (in coupled path 2). Therefore, there is a possibility that after merging, some solutions in bin X may not be sub-optimal at the upstream location. Therefore bin X cannot be pruned.

Corollary to theorem 2: A bin X cannot be pruned if some of the solutions in bin X are sub-optimal compared to some solutions in bin Y, and the other solutions in bin X are sub-optimal compared to some solutions in bin Z. This corollary is true even if dominating solutions come from more than two bins.

As an illustration of theorem 2, consider the following bins (each containing a single solution):

Coupled path 1: X (2, 13), Y(2, 13.1), Z(10, 15)
Coupled path 2: X (3, 17), Y(2.9, 14), Z(3, 17.1)

Notice that bin X is sub-optimal compared to bin Y in coupled path 1, and that bin X is sub-optimal compared to bin Z in coupled path 2. For merging a pair of solutions from two paths, assume the following delay computations are needed:

Co-branch 1: d=0.2*(c1+c2)
Co-branch 2: d=1.0*(c1+c2)

The following solutions will result in the upstream node after merging bins X, Y and Z, respectively from two paths.

Upstream Node: X(5, 12), Y(4.9, 9.1), Z(13, 4.1)

It can be easily seen that bin X is not sub-optimal at the upstream node. Therefore, bin X should not be pruned.

At times, we need to compare a set of bins with another set of bins. The following definition will apply in identifying a suboptimal set.

Definition: A set of bins X is said to be sub-optimal compared to a second set Y of bins if for every solution bin x∈X there exist a bin y∈Y such that x is sub-optimal to y.

With these new techniques for coupled pruning, we now can extend the abstract dynamic optimization techniques to a tree structure involving multiple cores, and beyond tree structures to general dag networks contain multiple input gates and hierarchical modules. Additional situations where the concept of coupled pruning applies exist as we have noted earlier. Other situations can be discovered via testing if the abstract model applies.

Bin Notations

We need to distinguish between a bin-type and an actual bin. Several bins can have the same bin type. In the above discussion, bins X, Y, Z, etc. denote actual bins (not bin types). For the following discussion we need to adopt a more restricted notation.

Coupled nodes may have multiple descendent nodes. Since each descendent node give rise to bins, one bin for each solution, multiple descendent nodes give rise to "combination" bins. Note that a descendent node can be a gate, for which each size may give rise to bins. Whether bins are to reflect gate sizes for a common descendent gate or solutions at a common descendent node, multiple descendents give rise to what is called a combination bin.

As an example, if we have two common descendents x and y (nodes or gates), the combination bins will be represented by x-y. Note that the notation "x-y" merely indicates the type of bin (the solutions in such a bin is for a common value of x and a common value of y.) Thus, bin $x_i$-$y_j$ corresponds to the ith solution or size for x (a node or a gate) and the jth solution or size for y (a node or a gate). The combination bins can also be due to common descendents which may not be the immediate downstream descendent, but a descendent of a descendent, etc.

Application of Concepts

The foundations laid out above can be used to deal with the most general situation of gate sizing and repeater insertion (as separate steps or concurrently) in the presence of multi-input gates and hierarchies (multiple core instances) in a general dag network. We will present details of some primitive steps such as solution generation, pruning and propagation inside cores, outside cores, across a multi-input gate, etc. The traditional concept of optimizing q at a single source (root) will be extended to the case of multiple sources. In addition to traditional pruning, we will show how solutions can be pruned based on certain available timing estimates. The additional pruning can be used to control the solution space and run time to a reasonable limit. Finally, we will provide a comprehensive example and an associated sequence of the primitive steps in obtaining the optimal solution.

Propagating Solutions Via a Multi-Input Gate

The following examples show how to recursively propagate solutions (n-tuples of performance and loading parameters) from two output nodes of a gate to two input nodes of the gate. The process, however, is easily extendable to more than two inputs and more than two outputs.

Case I: Single Solution at Each of One or More Output Nodes

Figure 7:
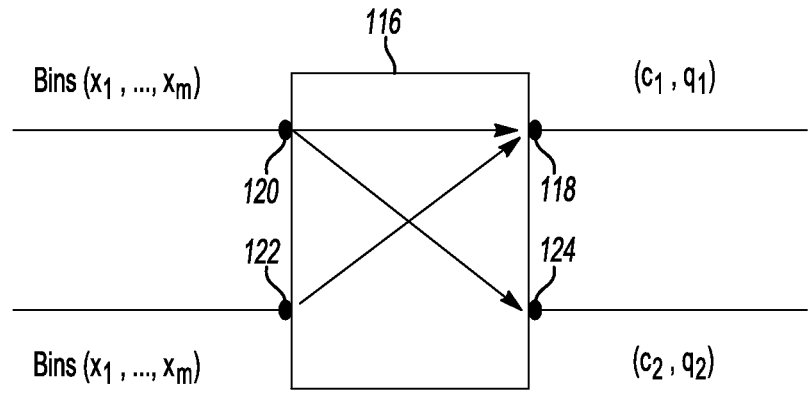
FIGS. 7 through 11 are schematic diagrams of an example gate having multiple input and output nodes.

Referring now to FIG. 7, assume a gate 116 has m discrete sizes. Solution ($c_1$, $q_1$) at node 118 needs to be propagated to both node 120 (using the timing-arc 120→118) and node 122 (using the timing arc 122→118), while the solution ($c_2$, $q_2$) at node 124 needs to be propagated only to the node 120 (using the timing arc 120→124).

Because there is only one solution at each of the nodes 118, 124, no binning is required as far as propagating solutions at nodes 118, 124 is concerned. Binning may be required to reflect the multiple sizes for gate 116 to facilitate pruning of sizes for gate 116 at upstream locations for nodes 120 and 122. Initially, each of the bins at node 120 will contain only one solution:

$(c_{i1}, q_{i1})$ for each size $i=1, \ldots, m$ of gate 116, where $c_{i1}$ is the input capacitance for size i of gate 116 at input 120, and $q_{i1}$ will be computed based on propagating solutions at nodes 118, 124 to node 120. Assume the delay value from node 120 to 118 is $d_{i13}$, and the delay value from node 120 to 124 is $d_{i14}$ under the loadings of the solutions at nodes 118, 124. Then $q_{i1}$ is computed as:

$q_{i1} = \min(q_1 - d_{i13}, q_2 - d_{i14})$.

The solution in bin $x_i$ at node 122 is given by $(c_{i2}, q_{i2})$ for each size $i=1, \ldots, m$ of gate 116, where $c_{i2}$ is the input capacitance for size i of gate 116 at input 122, and $q_{i2}$ will be computed based on propagating the solution at node 118 to node 122. Assume the delay value from node 120 to node 118 is $d_{i23}$ under the loading of the solutions at node 118. Then $q_{i2} = q_1 - d_{i23}$.

Case II: Single Solution at Node 118 and Multiple Solutions at Node 124

Figure 8:
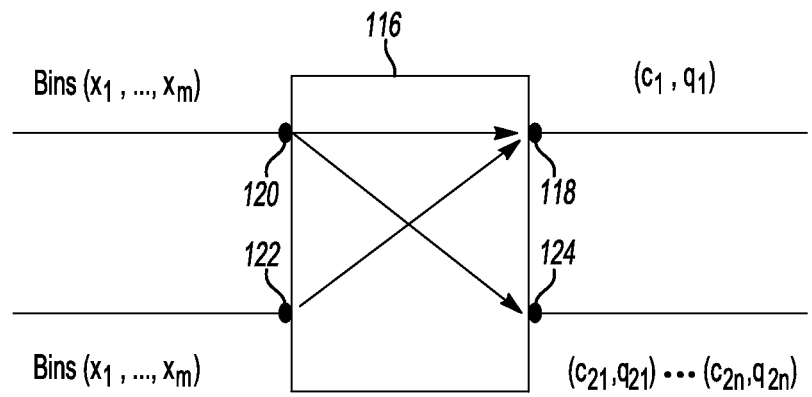

Referring now to FIG. 8, assume there is only one solution at node 118 and n (≥2) solutions at node 124. Note that the solutions at node 124 are propagated only to input node 120 (and not propagated to input node 122). For a given size i for gate 116, we compute n solutions at node 120:

$$(c_{i1}, q_{i11}) \text{ to } (c_{i1}, q_{i1n}) \qquad (1)$$

where $c_{i1}$ is the input capacitance of gate 116 for size i at input node 120 and $q_{i1j}$ is given by $q_{i1j} = \min(q_1 - d_{i13}, q_2 - d_{ij14})$ for j=1 to n where $d_{i13}$ is as defined above, and $d_{ij14}$ is the delay from node 120 to node 124 for the case when solution ($c_{2j}$, $q_{2j}$) is considered at node 124.

Note that the n solutions in (1) have the same c but different q and thus, pruning sub-optimal solutions will retain only one non-suboptimal solution. Again, each bin at node 120 (and node 122) will contain only one solution. The bins are, again, to reflect the sizes of gate 116.

Case III: Single Solution at Node 124 and Multiple Solutions at Node 118

Figure 9:
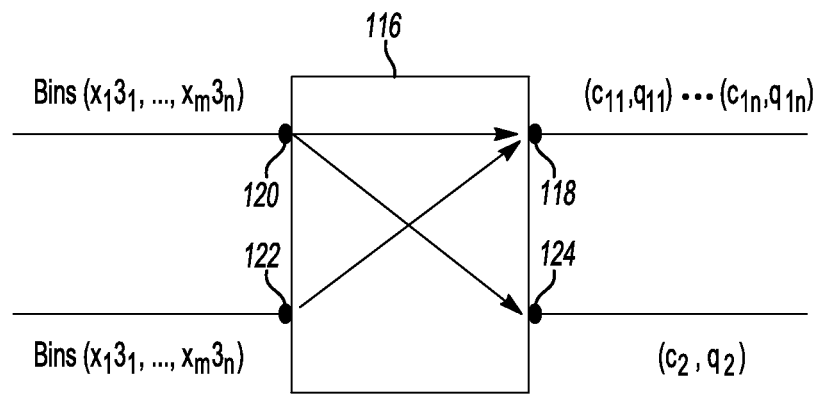

Referring now to FIG. 9, assume there are n (≥2) solutions at node 118. Only the solutions at node 118 are propagated to node 122 (and not the solutions at node 124). For a given size i for gate 116, we compute n solutions at node 122:

$$(c_{i2}, q_{i21}) \text{ to } (c_{i2}, q_{i2n}) \qquad (2)$$

where $c_{i2}$ is the input capacitance of gate 116 for size i at input node 122 and $q_{i2j}$ is given by $q_{i2j} = q_{1j} - d_{ij23}$ for j=1 to n where $d_{ij23}$ is the delay from node 122 to node 118 for the case when solution ($c_{1j}$, $q_{1j}$) is considered at node 118. Although these n solutions at node 122 have the same input capacitance, no pruning can be done yet because node 118 solutions are also reflected in computing node 120 solutions and thus, pruning solutions at node 120 and node 122 are coupled. These n solutions are put in n bins $Xi3_1$ to $Xi3_n$ respectively (here "3" is used in bin notation instead of "118" for brevity).

In contrast, the solutions at both node 118 and node 124 are propagated to node 120. For the solution j at node 118, we compute $q_{i1j}$ as follows:

$q_{i1j} = \min(q_{1j} - d_{i13j}, q_{2k} - d_{i14})$ where $d_{i13j}$ is the delay from node 120 to node 118 when gate size i is considered for gate 116, and solution j is considered at node 118. These n solutions are put in n bins for gate size i (bins $X_i 3_j$, j=1 to n), respectively. Once the solutions in all bins are computed, suboptimal bins are to be identified and pruned (discussed later).

Case IV: Multiple Solutions at Each of Nodes 118, 124

Figure 10:
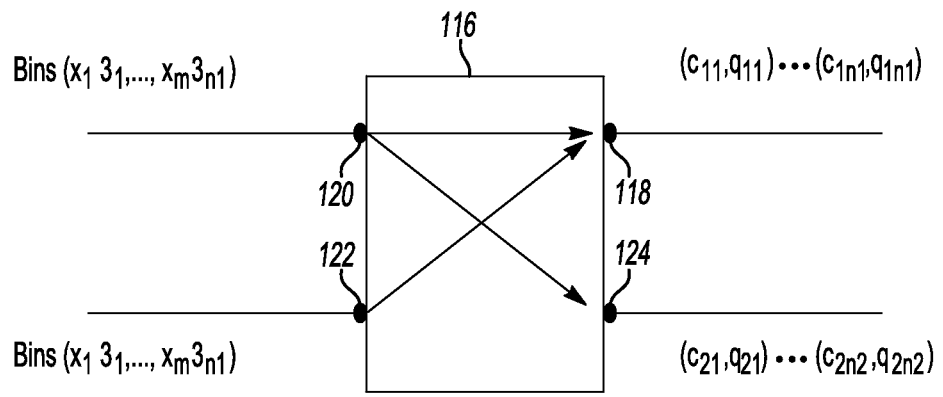

Refer to FIG. 10. Assume there are $n_1$ (≥2) solutions at node 118 and $n_2$ (≥2) solutions at node 124. Only the solutions at node 118 are propagated to node 122 (and not the solutions at node 124). For a given size i for gate 116, we compute $n_1$ solutions at node 122:

$$(c_{i2}, q_{i21}) \text{ to } (c_{i2}, q_{i2n1}) \qquad (3)$$

where $c_{i2}$ is the input capacitance of gate 116 for size i at input node 122 and $q_{i2j}$ is given by $q_{i2j} = q_{1j} - d_{ij23}$ for j=1 to $n_1$ where $d_{ij23}$ is the delay from node 122 to 118 for the case when solution ($c_{1j}$, $q_{1j}$) is considered at node 118. Although these n1 solutions at node 122 have the same input capacitance, no pruning can be done yet because node 118 solutions are also reflected in computing node 120 solutions and thus, pruning solutions at node 120 and node 122 are coupled. These $n_1$ solutions are put in $n_1$ bins $X_i3_1$ to $X_i3_{n1}$ respectively.

In contrast, the solutions at both nodes 118, 124 are propagated to node 120. There are $n_1*n_2$ combinations. We do not need to consider all combinations. Because, however, node 118 solutions are propagated to both node 120 and node 122, all solutions at node 118 must be considered. Combining the solutions at node 118 with some of the solutions at node 124 can be suboptimal, and thus avoided. To facilitate avoiding propagation of suboptimal combinations, we arrange the solutions in node 124 in ascending order of c. We use two pointers j and k to indicate the combination being considered. Initially, j points to the first solution at node 118 and k points to the first solution at node 124. For any (j,k) combination we compute $q_{i1jk}$ as follows:

$q_{i1jk} = \min(q_{1j} - d_{i13jk}, q_{2k} - d_{i14jk})$ where $d_{i13jk}$ is the delay from node 120 to node 118 when gate size i is considered for gate 116, solution j is considered at node 118, and solution k is considered at node 124. In the event the min value is dictated by $q_{1j}$, we advance the pointer at node 118 (avoiding combinations due to solutions j+1 to $n_2$ at node 124). Otherwise, the pointer at node 124 is advanced (keeping the pointer at node 118 fixed. The pointer at node 118 is advanced eventually when all $n_2$ solutions are considered at node 124).

All solutions arising from size i for gate 116 and the solution j at node 118 are put in bin $x_i3_j$. Once all the solutions are computed at node 120 and node 118 for all the bins, suboptimal bins are identified and pruned (as discussed below).

Figure 11:
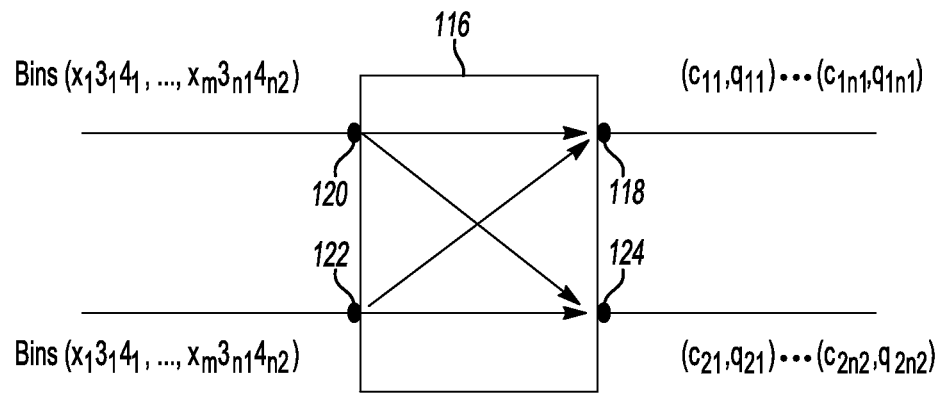

Case V: Multiple Solutions at Each of Nodes 118, 124 are Propagated to Multiple Input Nodes Referring now to FIG. 11, in this case, all solutions at nodes 118, 124 are propagated to both input nodes 120, 122. This case is similar to case IV, except that now solutions at node 124 will also give rise to bins. Thus, there will be $m*n_1*n_2$ bins at node 120 and node 122 (again bin notation 4 is used instead of 124). It is to be noted that most of the gates in integrated circuits have only one output node, and thus, the number of bins to be considered are not as high if there are multiple output nodes.

Propagating Bins Through a Gate

Propagating bins at the output node or nodes of a gate to the input nodes on coupled logic baths is similar to the above methods, except that we repeat the process for each bin-combination for the output node or nodes. For each bin-combination, the solutions are propagated by identifying the case (I through V) that applies and using the respective method. The solutions at the input nodes will be in combination bins to reflect combination of sizes at the output nodes, and also the sizes of the gate itself.

Also note that, for a single input gate, we do not create any bin based on the current gate size. The existing bins or bin combinations (at the output nodes), however, are preserved at the input nodes.

Pruning Bins from Multiple Coupled Locations

As the solutions are propagated upstream, we compare solutions in one bin with those in another bin at the same node. Some bins might be identified as suboptimal. We, however, cannot prune suboptimal bins unless they are suboptimal in all coupled nodes. Also, a bin may be dominating in one node and is dominated in another coupled node. The dominating and dominated relationships are to be explored at all coupled nodes to determine a maximum number of dominated bins that can be pruned.

Figure 12:
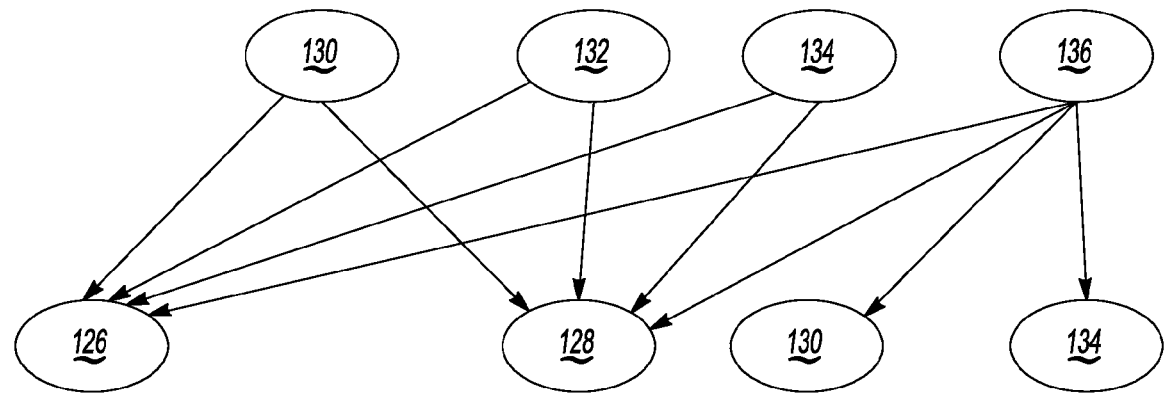
FIGS. 12 and 13 are schematic diagrams illustrating dominating to dominated bin relationships between example coupled nodes.
Figure 13:
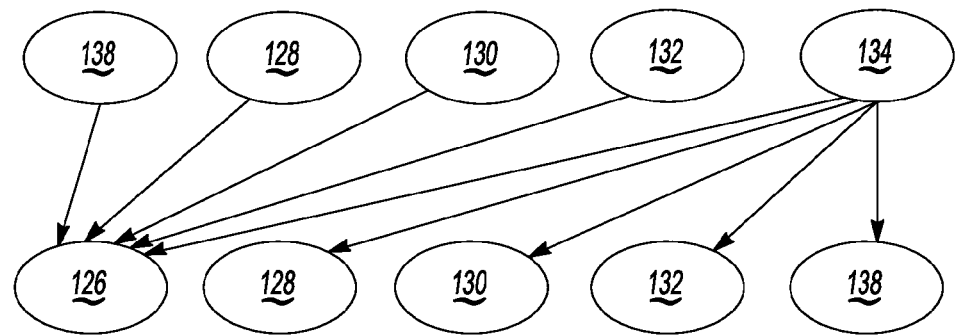

The following two tables show an example of the dominating and dominated relationship for two coupled branches. These relationships are captured in the two graphs of FIGS. 12 and 13, respectively. FIG. 12 illustrates the dominating to dominated relationship in coupled node 1. FIG. 13 illustrates the dominating to dominated relationship in coupled node 2. In these examples, there is only one solution bin. In general, however, there can be multiple solutions in a bin.

TABLE 5

Solution bins at one coupled node.

| Bin | c | q | Dominating Bin |
|---|---|---|---|
| 126 | 400 | 0 | 130, 132, 134, 136 |
| 128 | 360 | −7 | 130, 132, 134, 136 |
| 130 | 270 | 21 | 136 |
| 132 | 310 | 28 | |
| 134 | 210 | 3 | 136 |
| 136 | 210 | 27 | |

TABLE 6

Solutions generated at a second coupled node.

| Bin | c | q | Dominating Bin |
|---|---|---|---|
| 126 | 440 | −14 | 128, 130, 132, 134, 136 |
| 128 | 400 | 4 | 134 |
| 130 | 310 | 2 | 134 |
| 132 | 350 | −1 | 134 |
| 134 | 250 | 8 | |
| 136 | 250 | −2 | 134 |

Since we are looking for a common set of dominated bins in all coupled nodes, we must first identify the intersection of the dominated bins. For this example, the dominated sets are Node 1: Dominated set $X_1$={126, 128, 130, 134}
Node 2: Dominated set $X_2$={126, 128, 130, 132, 136}
Common dominated set $X = X_1 \cap X_2$={126, 128, 130}

Next we need to identify the common set of dominating bins at all coupled nodes. We only consider the dominating bins for which dominated bins are in the set X. For this example, Node 1: Dominating set $Y_1$={130, 132, 134, 136}
Node 2: Dominating set $Y_2$={128, 130, 132, 134, 136}
Common dominating set $Y = Y_1 \cap Y_2$={130, 132, 134, 136}

Note that the sets X and Y may not be disjoint. We need to resolve the overlap to make these two sets disjoint in a way to maximize the number of dominated bins. To solve this problem, we must consider the dominating to dominated relationships Y→X at both nodes and again observe the intersection. For this example, Node 1: Y→X=$E_1$={130→126, 130→128, 132→126, 132→128, 134→126, 134→128, 136→130}
Node 2: Y→X=$E_2$={130→126, 132→126, 134→126, 134→128, 134→130}
E=$E_1 \cap E_2$={130→126, 132→126, 134→126, 134→128}

We now can refine the sets X and Y by observing the dominating to dominated edges in the set E. For the example at hand:

$X$={126, 128} and $Y$={130, 134}

At times, sets X and Y may not be disjoint. In that case, we look at the common bins between the sets X and Y. We try to keep as many bins in the set X (dominated bins) when resolving to make X and Y disjoint.

We conjecture that the alternative choices for X and Y do not impact the optimization of our objective in any way.

Processing/Pruning Bins from Multiple Coupled Logic (Timing) Paths

For two or more coupled logic paths each of which contains multiple nodes (representing one or more gates and one or more candidate repeater locations), each node on a logic path is coupled to each node on a coupled logic path. The nodes on a single logic path must be traversed in a bottom-up manner. We can start with any logic path and start processing the nodes on this path. At each node we identify suboptimal bins. We can continue processing this logic path until we encounter a node with at least one suboptimal bin. At this point we can start processing a second coupled logic path, processing nodes in a bottom up manner. When we encounter a node where one or more suboptimal bins are identified, we can start processing the next coupled logic path, if any. Once we have identified one or more suboptimal bins at all coupled logic paths, we can solve the above problem of identifying a maximum set of suboptimal bins. This process continues until we process all nodes in all coupled logic paths. Solutions in uncoupled logic paths need to be propagated in the traditional way (solutions need not be in bins).

Some Solutions in Bins Along with Solutions Outside Bins

This situation arises, for example, in a multi-core scenario when a source of a net lies within a core. In this scenario, multiple instances of the same core will drive completely different RC trees due to the routes at the top level (outside core instances). The part of the RC trees at the top level (i.e. outside the core) are processed first to generate solutions at the candidate location(s), which are seen by the candidate location(s) from within the core. Then for each core, the solutions outside the core are propagated to the first candidate (or gate) location(s) within the core. The solutions propagated to the candidate location for different cores are expected to be different.

The logic paths and the nodes on those logic paths within the core are coupled together in an attempt to provide identical repeater and gate sizing solutions within the core. All solutions propagated, however, from the outside of the core do not need to be in bins, as they can be pruned independently unless some other couplings are implied due to common descendents outside the core instances. All other solutions reflecting one or more decisions for repeater choices within the core are coupled and need to be in bins.

Figure 14:
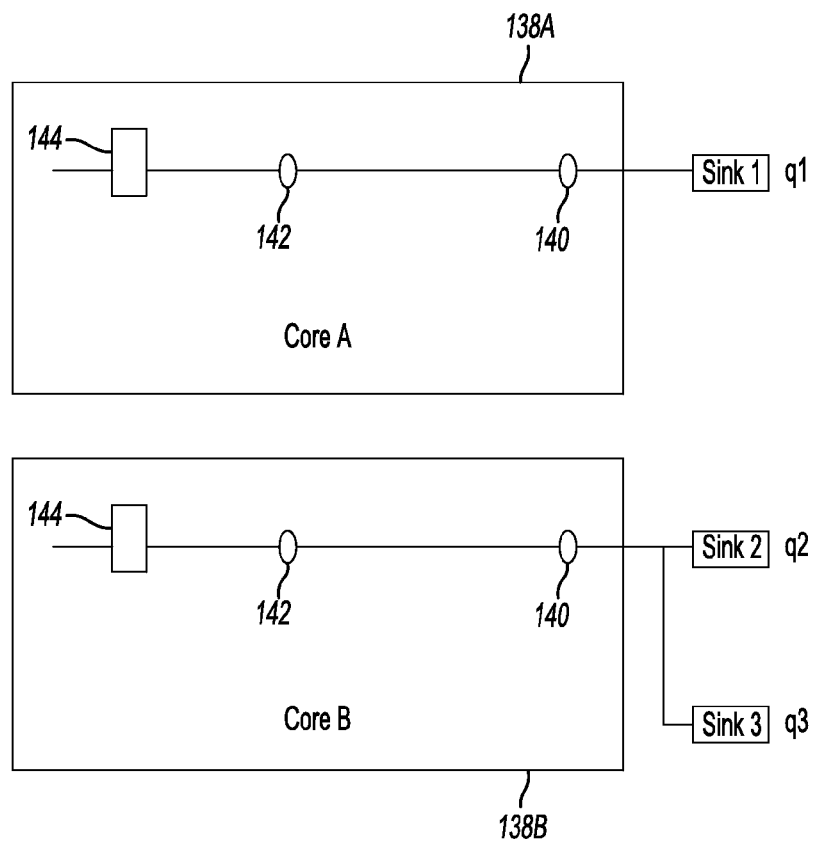
FIG. 14 is a schematic diagram of yet another example two-core hierarchical net.

Referring now to FIG. 14, assume the solution propagated from outside core 138A to node 140 within the core 138A is $S_1$ and the solution propagated from outside core 138B to node 140 within the core 138B is $S_2$. These solutions can be pruned independently and do not need be in bins.

The solutions within bins need to be propagated and pruned based on the method outlined above for coupled bins. Note that we may not need to resort to restrictions that the RC values for segments within the core instances be the same. In fact, the capacitance values for interconnects can be different for the same segment in different core instances due to variations in routing above the core instances (at the top level).

Propagating/Pruning Solutions from Inside Core Instances to Outside Core

Referring again to FIG. 3 (and assuming (i) an additional candidate location "79a" (not shown) is located between candidate location 80 and candidate location 78 of core 68a, and (ii) an additional candidate location "79b" (not shown) is located between candidate location 80 and candidate location 78 of core 68b), solutions at node 78 need to be propagated to these nodes 79a and 79b, which are outside the core. Since multiple logic paths outside the core instances will be connecting to the nodes within the core, these logic paths become coupled. Consider the six bins corresponding to the six non-sub-optimal solutions given in Table 1. These six solutions are generated at the candidate location 78. These solutions need to be propagated to the co-candidate-locations 79a and 79b. Candidate location 78 is a common descendent. Table 7 provides the solutions computed at locations 79a and 79b. That is, an n-tuple of performance and loading parameters (the c and q) for each of the candidate locations is determined based on a repeater delay model defined, in this example, in terms of delay, d, and resistance, r, and an interconnect model defined, in this example, in terms of capacitance, c.

TABLE 7

Solutions generated at candidate locations 79a and 79b.
$d_1 = 5, r_1 = 0.1, d_2 = 5, r_2 = 0.1$

| Bin | Location 78-76-74 | $c_{78}$ | Location 79a $q_{78a}\text{-}d_1\text{-}r_1{}^*c_{78}$ | Location 79b $q_{78b}\text{-}d_2\text{-}r_2{}^*c_{78}$ | Dominating Solution |
|---|---|---|---|---|---|
| 1 | 0-0-0 | 200 | 15 | 5 | 3 |
| 2 | 0-1-0 | 160 | 8 | 13 | 3 |
| 3 | 0-1-1 | 70 | 43 | 28 | |
| 4 | 0-0-1 | 110 | 54 | 39 | |
| 6 | 1-1-0 | 10 | 13 | 28 | |
| 8 | 1-0-1 | 10 | 43 | 18 | |

First we compute solutions at location 79a. We then recognize that the bins 1 and 2 are sub-optimal compared to bin 3. So then we start computing solutions at location 79b. We recognize that bins 1 and 2 are also sub-optimal at this location (compared to bin 3). Since bins 1 and 2 are sub-optimal at both co-branches, we can prune solutions in bins 1 and 2.

Merging Bins

TABLE 8

Merging bins from locations 79a and 79b to location 80.
$d_1 = 5, r_1 = 0.1, d_2 = 5, r_2 = 0.1, c_{80} = c_{79a} + c_{79b} + 90$

| Bin | 78-76-74 | $c_{79a}$ | $q_{80a} = q_{79a} - d_1 - r_1 * c_{79a}$ | $c_{79b}$ | $q_{80b} = q_{79b} - d_2 - r_2 * c_{79b}$ | $c_{80}$ | $q_{80} = \min(q_{80a}, q_{80b})$ |
|---|---|---|---|---|---|---|---|
| 3 | 0-1-1 | 120 | 36 | 100 | 13 | 310 | 13 |
| 4 | 0-0-1 | 160 | 33 | 140 | 20 | 390 | 20 |
| 6 | 1-1-0 | 60 | 2 | 40 | 19 | 190 | 2 |
| 8 | 1-0-1 | 60 | 32 | 40 | 9 | 190 | 9 |

Assuming $c_{79a}$ and $c_{79b}$ values for this example, and the delay models as given in table 8, we compute $q_{80a}$ (for propagating solutions from location 79a to location 80) and $q_{80b}$ (for propagating solutions from location 79b to 80). We compute $q_{80}$ as the minimum of $q_{80a}$ and $q_{80b}$. Values for $c_{80}$ are also given in table 8. The solution in bin 6 is suboptimal. The other three solutions are retained in location 80. But notice that since coupled solutions from locations 79a, 79b are merged at location 80, which is not coupled with any other node, we can take all the solutions out of the bins.

Merging Unrelated Bins

Figure 15:
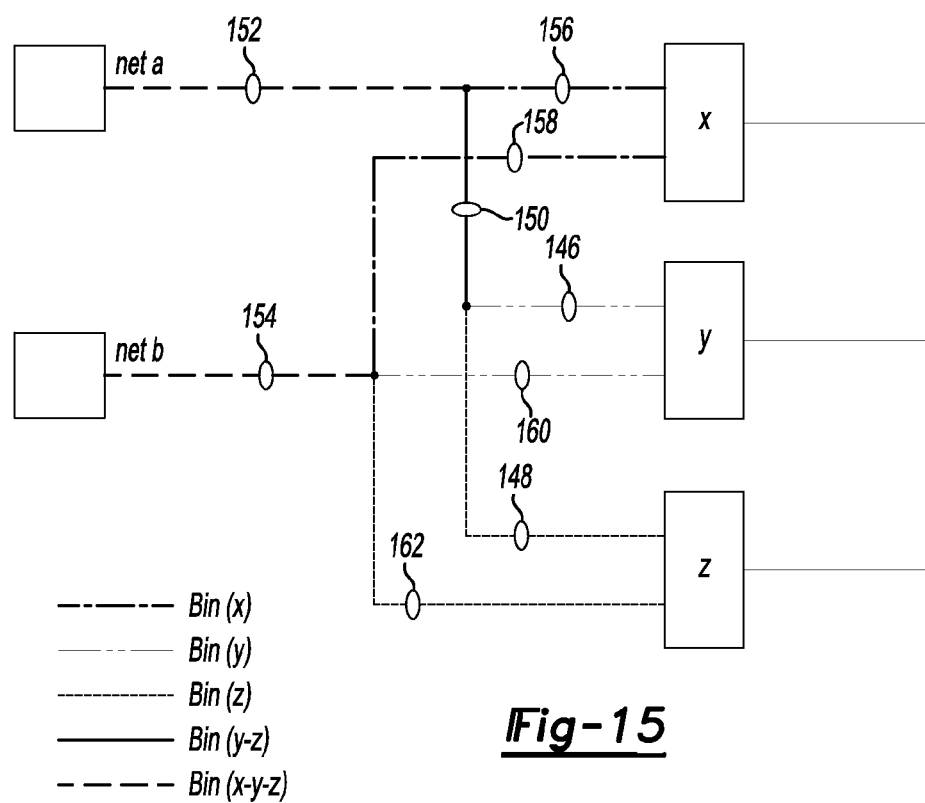
FIG. 15 is a schematic diagram of example nets connected to three logic gates.

Examples of merging unrelated bins can be found in FIG. 15. Bins at node 146 (y-bins) and 148 (z-bins) are merged and propagated to node 150. We create combination bins (y-z) at node 150 for each combination of bins at nodes 146 and 148. Therefore, if there are $n_2$ bins at node 146 representing $n_2$ sizes of gate y, and $n_3$ bins at node 148 representing $n_3$ sizes of gate z, then we have $n_2*n_3$ combination bins at node 150. It might be the case that some of the combination bins are suboptimal (at all coupled logic paths). Combination bins (x-y-z) will be created and populated at nodes 152, 154.

A different kind of merging might occur for combination bins. For example, consider two descendent nodes, one having (x-y) bins and the other having (x-y-z) bins. In this case, we create (x-y-z) bins in the upstream node. For example, to create (x=i, y=j, z=k) bin at the upstream location, we merge bin (x=I, y=j) at the first descendent node with bin (x=i, y=j, z=k) at the second descendent node.

Combination Bins in Multiple Logic Paths: Comparing One Bin at a Node with a Set of Bins at a Node on a Coupled Logic Path We have seen how a bin can represent a combination of sizes (or repeater solutions) for more than one gate or more than one candidate location. The nature of combinations can be different in different coupled logic paths.

Referring again to FIG. 15, two nets connect three gates x, y and z being sized. Coupled candidate locations 156, 158 will have only x bins, reflecting various sizes allowed for gate x. Coupled candidate locations 146, 160 will have only y bins, reflecting various sizes allowed for the gate y. Coupled candidate locations 148, 162 will have z bins, reflecting various sizes for the gate z. Solutions from node 146 (y bins) and node 148 (z bins) are merged at node 150, where solutions will be assigned in combination bins (y-z) reflecting combination of sizes for gates y and z. Similarly, each of candidate locations 152 and 154 will have combination bins (x-y-z) reflecting the combination of sizes for gates x, y and z.

In net a, the candidate locations could be processed in the order (156, 146, 148)-150-152, where nodes in parenthesis can be in any order. Similarly, the nodes in net b are to be ordered (158, 160, 162)-154. Due to coupling, however, pruning must be done according to coupling groups:

(156, 158), (146, 160), (148, 162), (150) and (152, 154)

Thus, the overall order can be (156, 158)-prune-(146, 160)-prune-(148, 162)-prune-(150)-prune-(152, 154)-prune. We, however, can choose the following order (156, 158)-prune-(146, 160)-prune-(148, 162)-prune-(154, 150)-prune-(152)-prune In this order, it is possible to prune bins considering (x-y-z) bins at node 154 and (y-z) bins at node 150. In doing so, assume bin (i,j) (x is of size i and y is of size j) at node 150 is suboptimal compare to bin (k,m). At node 154 we need to compare two sets of bins. Set 1 of bins at node 154 corresponds to size i for x, j for y, and all possible values of size for z. The set 2 of bins corresponds to size k for x, m for y, and all possible values of size for z. If all set 1 bins are suboptimal compared to set 2 bins, then we can prune set 1 bins at node 154 and the bin (i,j) at node 150.

Selection of Optimal Solutions at Start Nodes

When all solutions or solution-bins are propagated to the start nodes, we need to select the sizes of gates and repeater solutions in the whole design to optimize an objective. In a single net case, this objective is usually to maximize the q-value at the single source (root). In a dag, however, sources (or the start nodes) are usually multiple.

The sources in a dag are usually sequential elements (e.g. flops). One possible way is to propagate the solutions or solution bins from the output of the flops to the clock node by computing a delay (a clock-to-q value) corresponding to each solution. We usually have a clock arrival time $t_a$ at each clock pin. The propagated q-value in a solution in a bin (or a solution outside a bin) indicates if the arrival time is met. If not, there is a violation v indicated by $(t_a-q)$. For a single bin, we retain the solution that minimizes the violation.

Once the violations are determined for individual solutions or solutions inside bins, we identify coupling within the clock nodes by observing bin-types. There can be multi-way coupling. For example, we can have the following situations:

Clock Node 1: bins (x-y)
Clock Node 2: bins (x-y-z)
Clock Node 3: bins (z)

We need to compute the maximum violation for each combination of values for the bins. Then select the combination that minimizes the maximum violation. For example, assume we allow two values for each of x, y and z. Then there are 4 bins at node 1, 8 bins at node 2, and 1 bin at node 3. We have listed all these bins with maximum violation at each bin:

TABLE 9

Determining minimum violations for each bin

| Node 1 (x-y): Vmin | Node 2 (x-y-z): Vmin | Node 3 (z): Vmin |
|---|---|---|
| 1-1: 10 | 1-1-1: 7 | 1: 5 |
|  | 1-1-2: 18 | 2: 0 |
| 1-2: 6 | 1-2-1: 16 |  |
|  | 1-2-2: 0 |  |
| 2-1: 0 | 2-1-1: 19 |  |
|  | 2-1-2: 0 |  |
| 2-2: 12 | 2-2-1: 11 |  |
|  | 2-2-2: 5 |  |

We construct maximum violations for all size combinations:

TABLE 10

Maximum violation for all size combinations

| Size Combination | Maximum Violation |
|---|---|
| 1-1-1 | Max(10, 7, 5) = 10 |
| 1-1-2 | Max(10, 18, 0) = 18 |
| 1-2-1 | Max(6, 16, 5) = 16 |
| 1-2-2 | Max(6, 0, 0) = 6 |
| 2-1-1 | Max(0, 19, 5) = 19 |
| 2-1-2 | Max(0, 0, 0) = 0 |
| 2-2-1 | Max(12, 11, 5) = 12 |
| 2-2-2 | Max(12, 5, 0) = 12 |

Thus, the optimal solution with the minimum value of maximum violation is 2-1-2 with 0 value for the violation.

Although, in this example, we show that all combinations for sizes for a bin are present at the start nodes, it is possible that all combinations for sizes may not be present. Some of the combinations might have proven to be suboptimal, and thus pruned at downstream locations.

In general, we can identify multiple sets of coupled nodes. In each set, nodes in the set will be pair-wise coupled. We repeat the above process for each set of coupled nodes to identify the optimal bin (or solution) sizes to determine the gate sizes or the repeater solution in the whole circuit.

Complexity Reduction
Pruning at Coupled Logic Paths Using Arrival Time Estimates The above process of determining the optimal sizes can also be used to prune solutions or bins by using arrival time estimates at multiple coupled nodes. By comparing the arrival time $t_a$ (obtained from a static timer, for example, for the current sizes of gates, and current places of repeaters and their current sizes) at the node with the required arrival time q. If $q<t_a$ then we compute a violation $v=t_a-q$. We can identify solutions that have more c and more violation v. This method also helps identify sub-optimal bins. Common suboptimal bins in all coupled nodes are then pruned.

It is to be noted that an arrival time estimate is valid only with the existing design situation at the coupled nodes being visited. The solutions (in a bin or outside) may have different c loading then the loading in the current design. It is possible to compute more accurate values for arrival times at the nodes by computing new values of delays (using the loads in the solutions) from the sources driving the current nodes.

It is also possible to add uncertainty amounts (usually negative, as delays are expected to be reduced after optimization) to the arrival times. The uncertainty factors may result in less aggressive pruning to make sure that potential optimal solutions are not pruned.

Incremental Sizing Approach

We can solve the sizing (and repeater insertion problem) iteratively. For each iteration, we use only a few sizes for gates (e.g., 3 sizes—current size, one size higher and one size lower) and only a few repeater choices. We continue iterations until no improvement can be made in reducing cycle time reduction or other objectives (such as power, area, etc.)

Another Example

Figure 16:
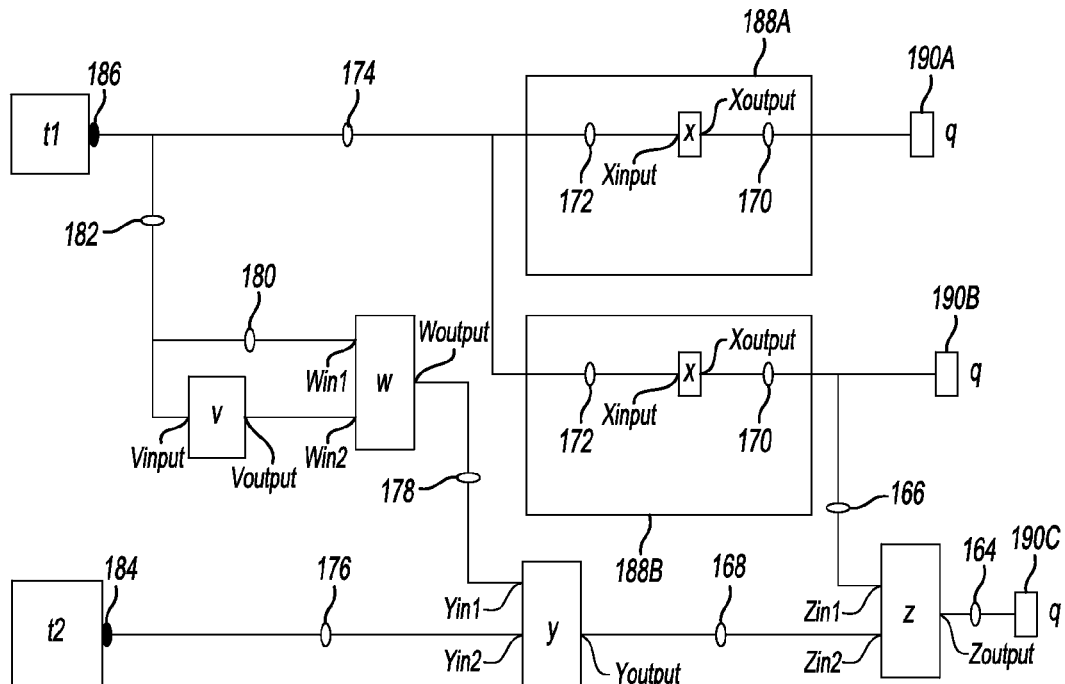
FIG. 16 is a schematic diagram of an example circuit with multiple core instances and multi-input gates.

The following example computations and comments reference FIG. 16 in which nodes are labeled 164 through 186, gates are labeled v, x, y, z, cores are labeled 188A, 188B, and sinks (timing path end nodes) are labeled 190A, 190B, 190C.

TABLE 11

Bins at various nodes (assuming optimal bin will not be selected by pruning alone)

| Node | Bins | Note |
|---|---|---|
| 164 | None | |
| Zoutput | None | |
| Zin1 | 164-Z | Z is a multinput gate; Bins at Zin1 and Zin2 contain solutions (n-tuples of performance and loading parameters) grouped based on assigned sizes of gate z and solutions at output node of gate z (Zoutput); Bins at Zin1 and Zin2 are recursively propagated along the coupled logic paths starting with Zin1 and Zin2 |
| Zin2 | 164-Z | Node coupled to Zin1 |
| 166 | 164-Z | Propagated from Zin1 |
| 168 | 164-Z | Propagated from Zin2 |
| 170 | (core 188B), 164-Z (core 188A), None | Node 170 exists in each instance of the cores 188A, 188B |
| 172 | (core 188B), 164-Z (core 188A), None | Node 172 exists in each instance of the cores 188A, 188B |
| 174 | 164-Z | Regrouping of bins; No coupling because of core locations 170, X and 172 |
| Youtput | 164-Z | Propagated from node 168 |
| Yin1 | 164-Z-Y | y is a multi-input gate; Bins propagated from Youtput |
| Yin2 | 164-Z-Y | Node coupled to Yin1 |
| 176 | 164-Z-Y | Propagated from Yin2 |
| 178 | 164-Z-Y | Propagated from Yin1 |
| Woutput | 164-Z-Y | Propagated from node 178 |
| Win1 | 164-Z-Y-W | w is a multi-input gate; Bins propagated from Woutput. |
| Win2 | 164-Z-Y-W | Node coupled to Win1 |
| 180 | 164-Z-Y-W | Propagated from Win1 |
| Voutput | 164-Z-Y-W | Propagated from Win2 |
| Vinput | 164-Z-Y-W | Propagated from Voutput |
| 182 | 164-Z-Y | Merged from nodes 180 and Vinput; No node coupling remains due to gate w |
| 184 | 164-Z-Y | Propagated from node 176 |
| 186 | 164-Z-Y | Merged from 174 and 182; No bin regrouping occurs, however, as node 184 is coupled with the same bin structure. |

The optimal solution for node 164 and the optimal sizes for gates z and y can be resolved by minimizing the maximum violation at the source nodes 184 and 186.

We carried out the above process for certain interconnect delay models and gate models for this example. We found that the optimal solution for node 164 was resolved at coupled nodes Zin1 and Zin2; the optimal gate size solution for gate z, which is adjacent to the timing path end node 190C, was resolved from the assigned gate sizes at coupled node Youtput and node 170 of core 188B; the optimal solution for node 170 was resolved at the Xoutput node of both of the cores 188A, 188B instances; the optimal solution for gate x was resolved at the node 172 for both of the cores 188A, 188B; the optimal solution for gate y was resolved at coupled nodes 174 and 184. Thus, nodes 184 and 186 do not remain coupled any more. The best solution for node 176 is determined at node 184, and the best solution for node 174 is determined at node 186.

Figure 17:
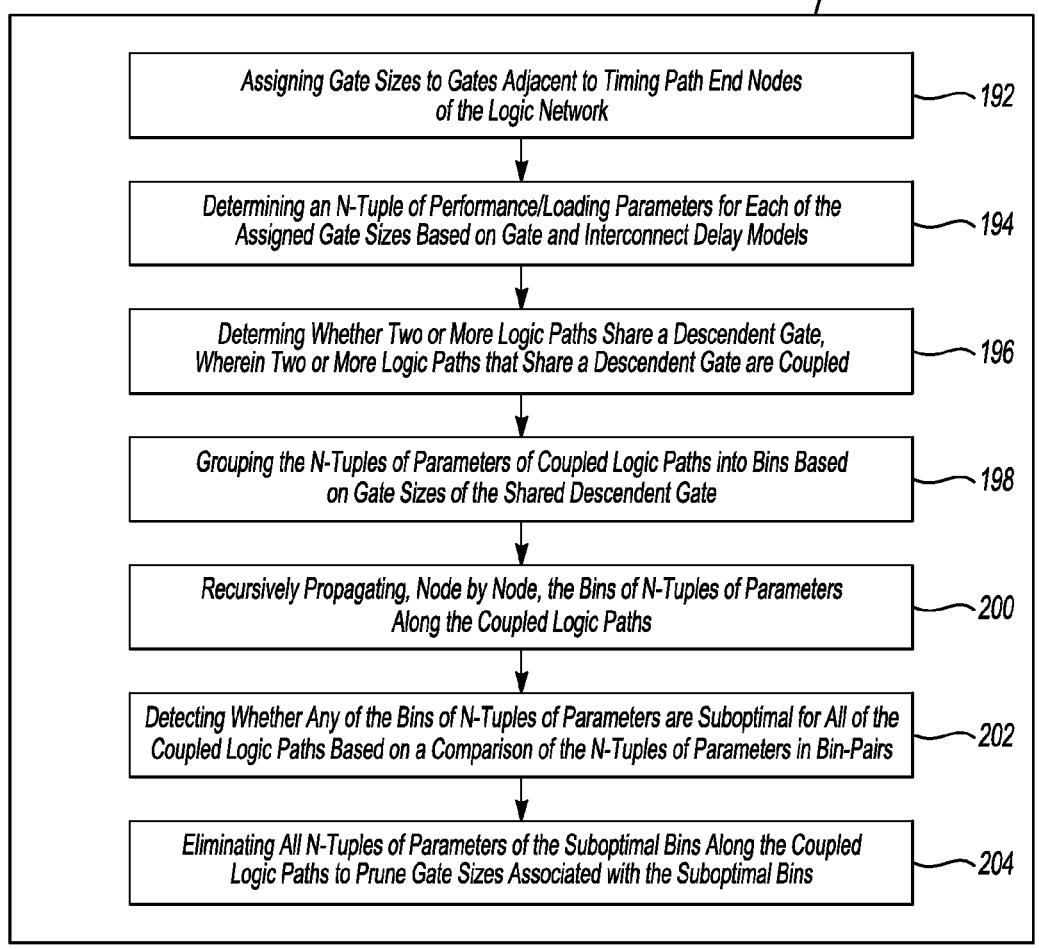
FIG. 17 is a block diagram of a system and method for selecting gate sizes for a logic network of an integrated circuit.

Referring to FIG. 17, gate sizes are assigned to gates adjacent to timing path end nodes of the logic network at operation 192. At operation 194, an n-tuple of performance/loading parameters is determined for each of the assigned gate sizes based on gate and interconnect delay models. At operation 196, it is determined whether two or more logic paths share a descendent gate, wherein two or more logic paths that share a descendent gate are coupled. At operation 198, the n-tuples of parameters of coupled logic paths are grouped into bins based on gate sizes of the shared descendent gate. At operation 200, the bins of n-tuples of parameters are recursively propagated, node by node, along the coupled logic paths. At operation 202, it is determined whether any of the bins of n-tuples of parameters are suboptimal for all of the coupled logic paths based on a comparison of the n-tuples of parameters in bin-pairs. At operation 204, all n-tuples of parameters of the suboptimal bins along the coupled logic paths are eliminated to prune gate sizes associated with the suboptimal bins.

As apparent to those of ordinary skill, the algorithms disclosed herein may be deliverable to a processing device, such as processing device 206, in many forms including, but not limited to, (i) information permanently stored on non-writable storage media such as ROM devices and (ii) information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), state machines, controllers or other hardware components or devices, or a combination of hardware, software and firmware components.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for selecting gate sizes for a logic network of an integrated circuit, wherein the logic network is defined by a plurality of logic paths that includes nodes, gates and interconnect, the method comprising:

assigning, at one or more computers, gate sizes to gates adjacent to timing path end nodes of the logic network;

determining an n-tuple of performance and loading parameters for each of the assigned gate sizes based on gate and interconnect delay models;

determining whether two or more logic paths share a descendent gate, wherein two or more logic paths that share a descendent gate are coupled and wherein the shared descendent gate resides within at least two instances of a hierarchical block;

grouping the n-tuples of performance and loading parameters of coupled logic paths into bins based on gate sizes of the shared descendent gate;

recursively propagating, node by node, the bins of n-tuples of performance and loading parameters along the coupled logic paths;

detecting whether any of the bins of n-tuples of performance and loading parameters are suboptimal for all of the coupled logic paths based on a comparison of the n-tuples of performance and loading parameters in bin-pairs; and eliminating all n-tuples of performance and loading parameters of the suboptimal bins along the coupled logic paths to prune gate sizes associated with the suboptimal bins.

2. The method of claim 1, wherein the hierarchical block is a processing core.

3. The method of claim 1, wherein the nodes comprise at least one of inputs to the gates and outputs to the gates.

4. The method of claim 1, wherein the n-tuple of performance and loading parameters includes at least one of required arrival time and capacitance.

5. The method of claim 1, wherein the n-tuples of performance and loading parameters of coupled logic paths are grouped into bins as long as there is at least two non-suboptimal bins of n-tuples of performance and loading parameters for each node along the coupled logic paths.

6. A method for selecting repeater locations and sizes for a logic network of an integrated circuit, wherein the logic network is defined by a plurality of logic paths that includes nodes, gates and interconnect, and wherein at least some of the nodes are candidate locations for repeaters, the method comprising:

assigning, at one or more computers, repeater sizes to candidate locations adjacent to timing path end nodes of the logic network;

determining an n-tuple of performance and loading parameters for each of the assigned repeater sizes based on (i) repeater delay and loading models, and (ii) interconnect delay models;

determining whether two or more logic paths share a descendent candidate location, wherein two or more logic paths that share a descendent candidate location are coupled and wherein the shared descendent candidate location resides within at least two instances of a hierarchical block;

grouping the n-tuples of performance and loading parameters of coupled logic paths into bins based on n-tuples of performance and loading parameters of the shared descendent candidate location;

recursively propagating, node by node and candidate location by candidate location, the bins of n-tuples of performance and loading parameters along the coupled logic paths;

detecting whether any of the bins of n-tuples of performance and loading parameters are suboptimal for all of the coupled logic paths based on a comparison of the n-tuples of performance and loading parameters in bin-pairs; and eliminating all n-tuples of performance and loading parameters of the suboptimal bins along the coupled logic paths to select repeater locations and sizes for the logic network.

7. The method of claim 6, wherein the hierarchical block is a processing core.

8. The method of claim 6, wherein the n-tuple of performance and loading parameters includes at least one of required arrival time and capacitance.

9. The method of claim 6, wherein the n-tuples of performance and loading parameters of coupled logic paths are grouped into bins as long as there is at least two non-suboptimal bins of n-tuples of performance and loading parameters for each candidate location or node along the coupled logic paths.

10. A system for concurrently selecting gate sizes, and repeater locations and sizes for a logic network of an integrated circuit, wherein the logic network is defined by a plurality of logic paths that includes nodes, gates and interconnect, and wherein at least some of the nodes are candidate locations for repeaters, the system comprising:

one or more computers configured to
assign gate sizes to gates adjacent to timing path end nodes of the logic network,
assign repeater sizes to candidate locations adjacent to the end nodes,
determine an n-tuple of performance and loading parameters for (i) each of the assigned gate sizes based on gate and interconnect delay models, and (ii) each of the assigned repeater sizes based on repeater delay and loading models, and the interconnect delay models,
determine whether two or more logic paths share a descendent gate or a descendent candidate location, wherein two or more logic paths that share a descendent gate or a descendent candidate location are coupled and wherein the shared descendent gate resides within at least two instances of a hierarchical block,
group the n-tuples of performance and loading parameters of coupled logic paths into bins based on (i) gate sizes of the shared descendent gate, and (ii) n-tuples of performance and loading parameters of the shared descendent candidate location,
recursively propagate, node by node and candidate location by candidate location, the bins of n-tuples of performance and loading parameters along the coupled logic paths,
detect whether any of the bins of n-tuples of performance and loading parameters are suboptimal for all of the coupled logic paths based on a comparison of the n-tuples of performance and loading parameters in bin-pairs, and
eliminate all n-tuples of performance and loading parameters of the suboptimal bins along the coupled logic paths to (i) prune gate sizes associated with the suboptimal bins, and (ii) select repeater locations and sizes for the logic network.

11. The system of claim 10, wherein the hierarchical block is a processing core.

12. The system of claim 10, wherein the nodes comprise at least one of inputs to the gates and outputs to the gates.

13. The system of claim 10, wherein the n-tuple of performance and loading parameters includes at least one of required arrival time and capacitance.

14. The system of claim 8, wherein the n-tuples of performance and loading parameters of coupled logic paths are grouped into bins as long as there is at least two non-suboptimal bins of n-tuples of performance and loading parameters for each node along the coupled logic paths.

15. The system of claim 8, wherein the shared descendent candidate location resides within at least two instances of a hierarchical block.

* * * * *